United States Patent [19]

Erhart et al.

[11] Patent Number: 5,208,833
[45] Date of Patent: May 4, 1993

[54] MULTI-LEVEL SYMBOL SYNCHRONIZER

[75] Inventors: Richard A. Erhart, Boynton Beach; David F. Willard, Plantation; James G. Mittel, Boynton Beach, all of Fla.

[73] Assignee: Motorola, Inc., Schaumburg, Ill.

[21] Appl. No.: 681,841

[22] Filed: Apr. 8, 1991

[51] Int. Cl.[5] ............................................. H03K 13/24
[52] U.S. Cl. ....................................... 375/20; 375/113
[58] Field of Search ..................... 375/17, 20, 113, 120

[56] References Cited

U.S. PATENT DOCUMENTS

| | | | |
|---|---|---|---|
| 3,775,688 | 11/1973 | Hinashita et al. | 375/17 |
| 4,571,735 | 2/1986 | Furse | 375/20 |
| 4,965,814 | 10/1990 | Yoshida et al. | 375/118 |
| 5,052,031 | 9/1991 | Molloy | 375/120 |
| 5,065,384 | 11/1991 | Yokogawa | 375/120 |

Primary Examiner—Curtis Kuntz
Assistant Examiner—Vijay Shankar
Attorney, Agent, or Firm—Philip P. Macnak; William E. Koch; Thomas G. Berry

[57] ABSTRACT

A symbol synchronizer for a communication receiver receiving multi-level data signals includes a reference clock generator for generating a reference clock signal having a predetermined time period, a state change detector for detecting state changes occurring within the received multi-level data signals over the predetermined time period to enable determining a time location corresponding to the detected state change wherein the time locations are assigned predetermined numeric values corresponding to the time locations determined, an accumulator for accumulating a time location for the time locations selected, and a phase adjusting circuit which is responsive to the time location count for adjusting the phase of the reference clock signal relative to the received multi-level data signal.

20 Claims, 16 Drawing Sheets

MULTI-LEVEL SYMBOL SYNCHRONIZER

BACKGROUND OF THE INVENTION

This invention relates generally to the field of symbol synchronizers, and more specifically, to a symbol synchronizer suitable for synchronizing multi-level frequency modulated information.

DESCRIPTION OF THE PRIOR ART

Digital communication systems, such as selective call paging systems have utilized binary digital signaling formats for many years. When such digital signaling formats have been utilized, the digital information has been modulated onto the carrier, using such modulation techniques as frequency shift keying (FSK) wherein the digital information is direct FM modulated onto the carrier. Within the receiver, the frequency shift keyed carrier was demodulated, and further processed, such as through a limiter, to provide a digital signal which would then be processed using any number of known techniques to achieve bit synchronization with the received signal. Such modulation and demodulation techniques as described, while they have been very effective at lower data bit rates, such as at data bit rates below approximately 6000 bits per second, are not effective at higher data bit rates due to synchronization problems in simulcast transmission systems. As a result, other modulation techniques are required to enable higher data throughput at lower symbol rates. One such modulation technique which allows higher data throughput at lower symbol rates is through the use of a multi-level frequency modulation technique, such as four level FM. As compared to conventional frequency shift keyed modulation, four level FM allows twice the data throughput for a given data symbol rate. As can be seen in FIG. 1, a four level FM signal has a relatively small time period of stable data values and a relatively large time period in which various transitions between symbol states can be occurring. As a consequence, the current techniques utilized to detect the digital symbols would require an extremely large integration time to properly find the center of the data received. Such large integration times would compromise the effectiveness of such multi-level FM modulation techniques by requiring the receiver to synchronize to the average of many symbol transitions. This requirement reduces the battery save factor of the receiver and may require more overhead in a signal for acquisition. What is needed is a means for rapidly achieving symbol synchronization in a multi-level FM modulation system, which would also enable periodic adjustment of the symbol synchronization during long strings of data.

SUMMARY OF THE INVENTION

A symbol synchronizer for a communication receiver receiving multi-level data signals is described which includes a reference clock generator for generating a reference clock signal having a predetermined time period, a state change detector for detecting state changes occurring within the received multi-level data signals over the predetermined time period generating time location values identifying time locations corresponding to the detected state change, an accumulator for accumulating a total time location value for the time location values generated, and a phase adjusting circuit which is responsive to the total time location value for adjusting the phase of the reference clock signal relative to the received multi-level data signal.

A method for synchronizing a received multi-level data signals is described which includes generating a reference clock signal having a predetermined time period, detecting state changes occurring within the received multi-level data signals over the predetermined time period and generating time location values identifying time locations corresponding to the detected state change, accumulating a total time location value for the time location values generated, and adjusting the phase of the reference clock signal relative to the received multi-level data signal in response to the total time location value accumulated.

DESCRIPTION OF THE PREFERRED EMBODIMENTS

Figure 1:
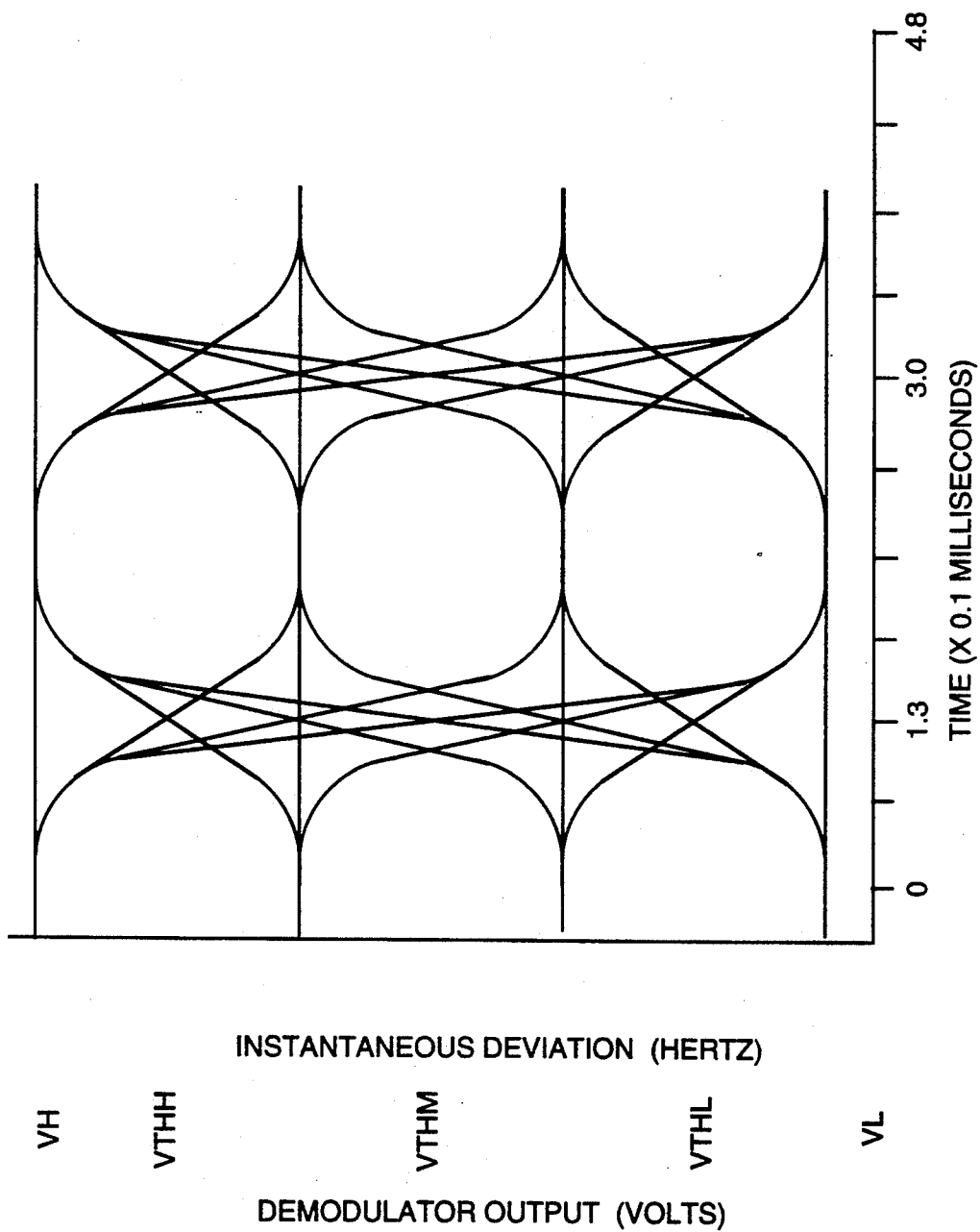
FIG. 1 is a graphical representation of an "eye pattern" for a demodulated four level frequency modulated signal.

Referring to the drawings, FIGS. 1-16 illustrate a multi-level symbol synchronizer in accordance with the present invention. In particular, FIG. 1 is a graphical representation of an "eye pattern" for a demodulated four level frequency modulated data signal. The vertical axis of the graph represents the instantaneous deviation of the transmitted multi-level data signal measured in frequency units, such as Hertz, and the corresponding demodulator output voltage within a receiver, measured in volts. As can be seen, the signal deviation for the four level signal varies between four predetermined deviation values: $+\Delta 2$, $+\Delta 1$, $-\Delta 1$ and $-\Delta 2$ Hertz. It will be also appreciated that the actual deviation frequencies are a function of the symbol rate employed for the transmitted data and the particular channel spacing. The recovered demodulator output voltage then varies between $V_L$ and $V_H$ volts. It will be appreciated that the actual recovered demodulator output voltage is a function of the deviation of the transmitted data signal and the particular design of the demodulator. In addition to the maximum demodulator output voltage $V_H$ and the minimum demodulator output voltage $V_L$, three other predetermined demodulator output voltages are shown, indicated as $V_{THL}$, $V_{THM}$ and $V_{THH}$, which represent the threshold voltages used to define the recovered four level data signal. The horizontal axis represents time measured in time units of one-tenth milliseconds, which corresponds in the example to a 6000 symbol per second data signal. It will be appreciated that for other data signal rates, the time units will vary accordingly. The "eye pattern" shown represents a random four level data signal, which has been confined to a relatively narrow spectral bandwidth due to splatter filtering in the transmitter and waveshaping in the receiver, such as would be encountered in a normal data transmission. The variations in the demodulator output voltage as the voltage traverses between any two given levels are due to variations in charge storage within the data filter caused by the previously transmitted data pattern at any instant in time.

Figure 2:
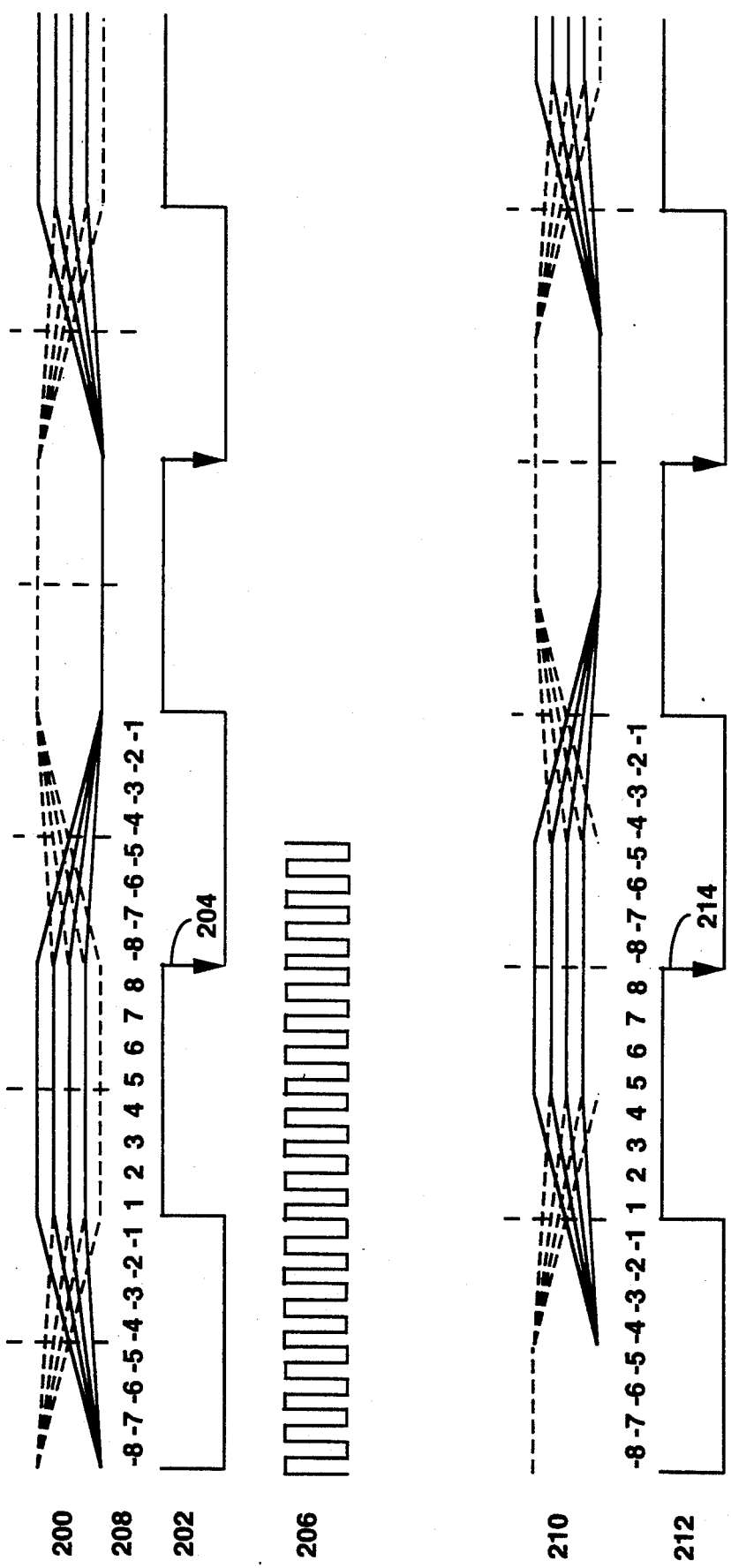
FIG. 2 is a timing diagram showing the relationship between an out-of-phase and an in-phase multilevel FM signal and a recovered clock signal.

FIG. 2 is a timing diagram showing the relationship between a recovered clock signal which is out-of-phase and in-phase with a multilevel demodulated FM signal, such as that utilized for data symbol recovery. The out-of-phase clock signal 202 is shown relative to the multilevel demodulated FM signal 200. In the preferred embodiment of the present invention, the normal data signal sample occurs on the falling edge 204 of the recovered clock signal 202, and as shown, sampling of the multilevel demodulated FM signal 200 which is out of phase with the recovered clock signal 202 results in a high probability of erroneous symbol recovery. In contrast, sampling of the multilevel demodulated FM signal 210 which is in-phase with the symbol sample edge 214 of the recovered clock signal 212, which occurs at the symbol center, results in a high probability of correct symbol recovery. In the operation of the multi-level symbol synchronizer to be described in detail below, a sample clock 206 is generated having a predetermined time relationship to the recovered clock signal 202, which for purposes of example is shown at 16X the recovered clock frequency. As shown in FIG. 2, for each sample clock pulse generated during the recovered clock signal 202, a numeric value 208 is assigned which identifies the time location of each sample clock pulse relative to the recovered clock 202. In the preferred embodiment of the present invention, each sample clock pulse is assigned a negative integer value ranging from $-8$ to $-1$ during the logic zero portion of the recovered clock signal 202, and a positive integer value ranging from 1 to 8 during the logic one portion of the recovered clock signal 202. The symbol sample edge 204 occurs between the sample clock pulse having a time location value of $+8$ and the sample clock pulse having a time location value of $-8$, signifying the falling edge of the recovered clock.

Figure 3:
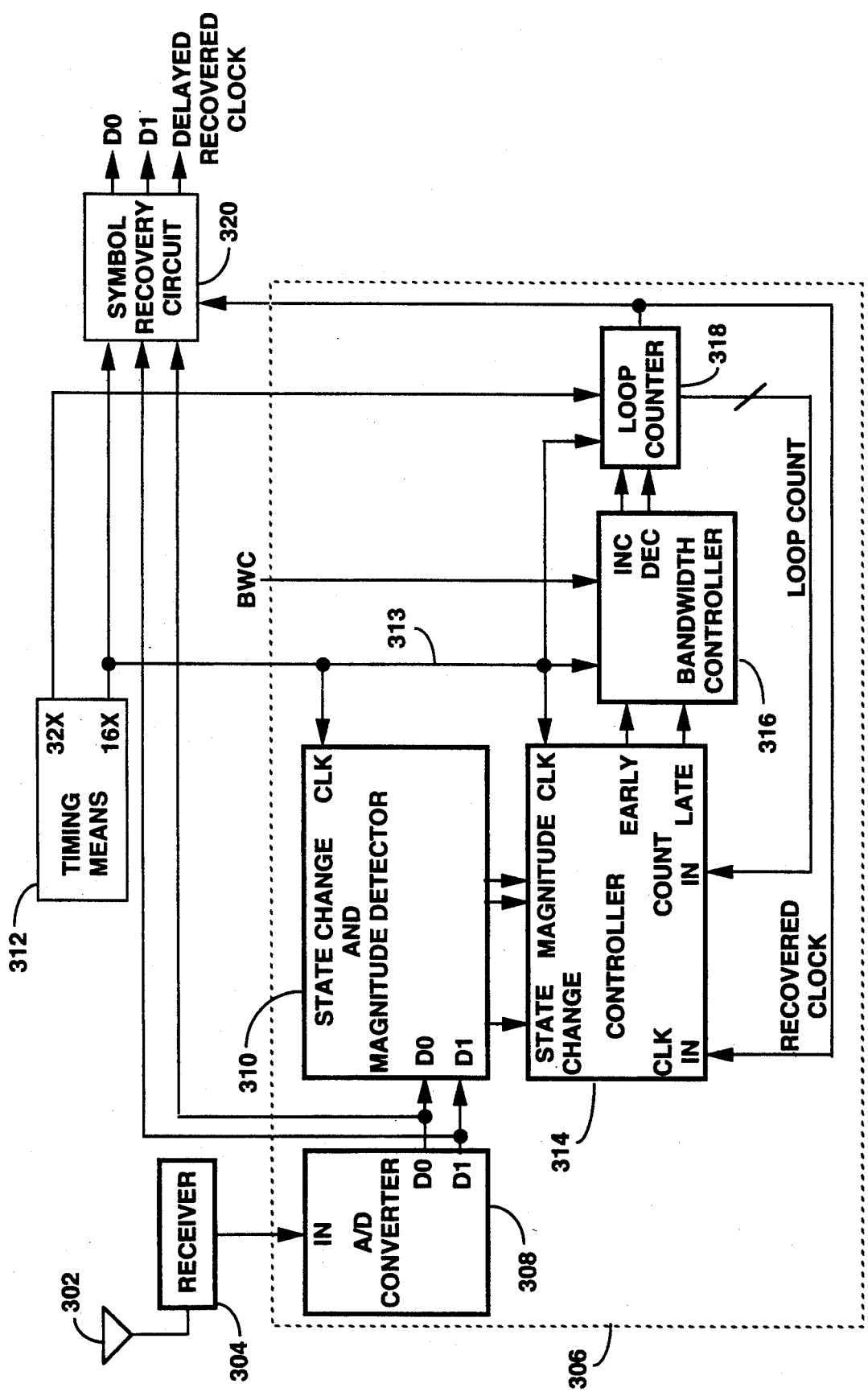
FIG. 3 is an electrical block diagram of the multi-level symbol synchronizer in accordance with the present invention.

FIG. 3 is an electrical block diagram illustrating the preferred embodiment of the multi-level symbol synchronizer in accordance with the present invention. A multi-level FM modulated signal, such as the four level FM modulated signal described above, is intercepted by the antenna 302 and coupled into a receiver 304. The receiver receives and demodulates the FM modulated signal in a manner well known in the art. The demodulated output of the receiver 304 is a signal waveform varying in voltage amplitude in a manner representative of the instantaneous frequency deviation of the received four level FM modulated signal, resulting in a demodulated data signal having four voltage amplitude levels such as shown in FIG. 1 for a randomly modulated FM signal modulated by a random data sequence.

Returning to FIG. 3, the demodulated data signal is coupled to the input of the symbol synchronizer 306, in particular to the input of an A/D converter 308. The A/D converter 308 converts the demodulated data signal into four two bit binary words, or binary bit pairs, corresponding to each of the four voltage amplitude levels corresponding to the demodulated data signal. The output of the receiver is a stream of demodulated data signals having varying amplitude values which results in a stream of binary bit pairs corresponding to the voltage amplitude levels being generated at the output of the A/D converter 308 at any instant in time. The sequence of binary bit pairs is coupled to the input of a state change and magnitude detector circuit 310. The state change and magnitude detector circuit 310 also receives a sample clock input from a timing means 312, such as a crystal controlled oscillator operating at a predetermined multiple of the expected symbol rate. The timing means 312 generates a 16X sample clock 313 having a rate which is sixteen times the rate of the recovered clock signal, resulting in the generation of sixteen sample clock pulse intervals per symbol as shown and described in FIG. 2. It will be appreciated by one of skill in the art that other sample clock rates can be utilized as well, depending upon the degree of resolution required for symbol synchronization between the received demodulated data signals and a recovered clock signal.

Returning to FIG. 3, in a first embodiment in accordance with the present invention, the state change and magnitude detector circuit 310 periodically samples the binary bit pairs to detect any state changes which occur in the demodulated data signal, such as that which occurs during transitions from one demodulated data signal voltage amplitude level to another. In a second embodiment in accordance with the present invention, the state change and magnitude detector circuit 310 also detects the magnitude of the state change in the demodulated data signal. The change of state and magnitude information derived by the state change and magnitude detector circuit 310 is coupled to the input of a controller 314, to be processed as described below.

The controller 314 receives the 16X sample clock 313 from the timing means 312, the recovered clock signal and a loop count signal from a loop counter 318, as will be described in detail below, and processes the change of state and magnitude information, to derive an EARLY or a LATE recovered clock adjustment signal indicating that the demodulated data signal is either early or late in comparison to the recovered clock signal. The early and late recovered clock adjustment signals are coupled to a bandwidth controller 316 which controls the rate of adjustment of the recovered clock signal, as will be described in detail below.

The bandwidth controller 316 receives a bandwidth control signal (BWC) from an external controller (not shown), and the 16X sample clock 313 from the timing means 312. The external controller is responsive to the signaling protocol utilized during message transmission, switching the bandwidth controller 316 bandwidth following FRAME synchronization, which is obtained in a manner well known in the art. The bandwidth control signal (BWC) enables either continuous adjustment of the recovered clock signal during a synchronization acquisition mode, or a non-continuous adjustment of the recovered clock signal during a synchronization maintenance mode, as will be described in detail below. The bandwidth controller 316 provides a positive recovered clock adjustment signal (INC) when the demodulated data signal leads, or is early, in comparison to the recovered clock signal. The bandwidth controller 316 also provides a negative recovered clock adjustment signal (DEC) when the demodulated data signal lags, or is late, in comparison to the recovered clock signal. The positive and negative recovered clock adjustment signals are generated for a period equal to one or more 16X sample clock periods, as will be described in detail below, and are coupled to the loop counter 318 which generates the recovered clock signal.

The loop counter 318, is also coupled to the 16X sample clock, and to at least a 32X sample clock, or clock thirty-two times the recovered clock signal rate. In a first embodiment of the present invention, when a positive recovered clock adjustment signal is coupled to the loop counter 318, the 32X sample clock is coupled to the loop counter, advancing the loop counter two counts, thereby advancing the recovered clock relative to the demodulated data signal by a time corresponding to one eight of the symbol period. When a negative recovered clock adjustment signal is disabled to the loop counter, the 16X sample clock is coupled to the loop counter 318, inhibiting the loop counter count one count, thereby retarding the recovered clock relative to the demodulated data signal by a time corresponding to one sixteenth of the symbol period. In the absence of an INC or DEC signal, the loop counter is coupled to the 16X sample clock, and is advanced one count per sample clock.

Figure 4:
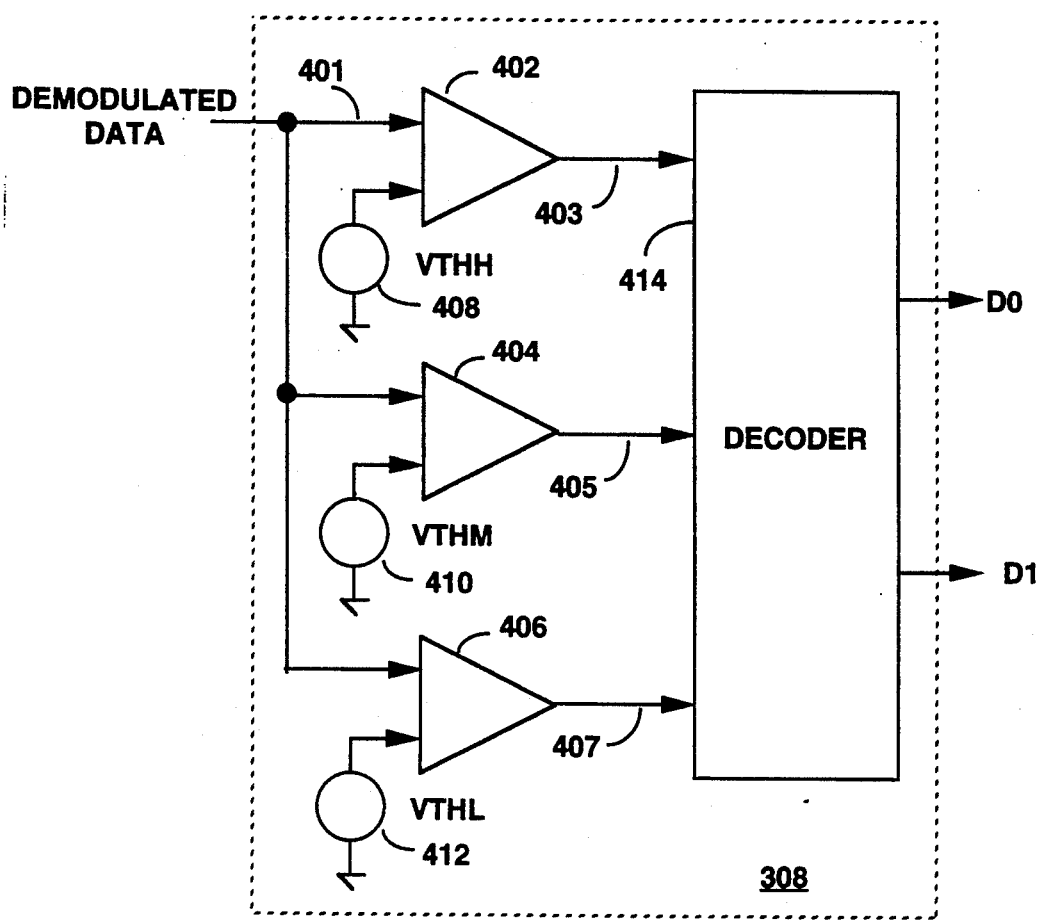
FIG. 4 is an electrical block diagram of the analog to digital converter utilized in accordance with the present invention.

The binary bit pairs generated at the output of the A/D converter 308 are also coupled, along with the 16X sample clock and the recovered clock signal, to a symbol recovery circuit 320. The symbol recovery circuit 320 provides a final adjustment of the demodulated data signals relative to a delayed recovered clock signal, as will be described in detail below. FIG. 4 is an electrical block diagram of one embodiment of the A/D converter 308 utilized in the multi-level symbol synchronizer in accordance with the present invention. In the embodiment shown, the demodulated data signal is coupled to a first input of three threshold detector circuits 402, 404 and 406, which are preferably constructed using voltage comparator circuits. The second input of threshold detector 402 is coupled to a first voltage reference 408 which corresponds to the high voltage amplitude threshold VTHH shown in FIG. 1. The second input of threshold detector 404 is coupled to a second voltage reference 410 which corresponds to the intermediate voltage amplitude threshold VTHM shown in FIG. 1. And the second input of threshold detector 406 is coupled to a third voltage reference 412 which corresponds to the low voltage amplitude threshold VTHL shown in FIG. 1. The voltage reference circuits 408, 410 and 412 are well known in the art, and are preferably compensated to track the demodulator output over environmental conditions, such as temperature and may be also dynamically acquired from the received signal maximum and minimum voltage range. Each of the outputs of the threshold detector circuits 402, 404 and 406 couple to inputs of a decoder circuit 414 which decodes the input signals to generate the binary bit pairs corresponding to the demodulated data signal voltage amplitude values. TABLE I below provides the truth table for operation of the A/D converter 308 described.

TABLE I

| Demodulated Data Signal Amplitude V 401 | V 407 | V 405 | V 403 | D1 | D0 |
|---|---|---|---|---|---|
| Vin < VTHL | 0 | 0 | 0 | 0 | 0 |
| VTHL < Vin < VTHM | 1 | 0 | 0 | 0 | 1 |
| VTHM < Vin < VTHH | 1 | 1 | 0 | 1 | 1 |
| VTHH < Vin | 1 | 1 | 1 | 1 | 0 |

In summary, as can be seen from TABLE I, the output of the A/D converter 308 is one of four two-bit binary words, or binary bit pairs, corresponding to the four voltage amplitude levels of the demodulated data signal, which as shown represent a "gray code" representation of the binary data, which insures that only one of the binary bit pairs will change state when the demodulated data changes between any two adjacent voltage levels.

Figure 5:
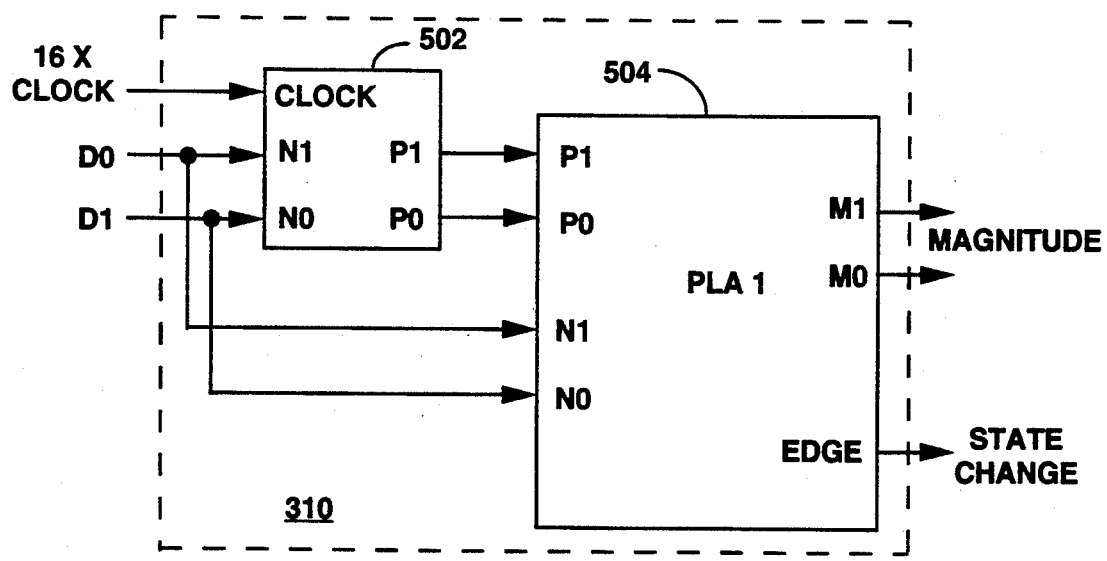
FIG. 5 is an electrical block diagram of the state change and magnitude detector utilized in accordance with the present invention.

FIG. 5 is an electrical block diagram of the state change and magnitude detector circuit 310 utilized in the multi-level symbol synchronizer in accordance with the present invention. The binary bit pairs generated by the A/D converter are coupled to the data inputs of the state change and magnitude detector circuit 310, and in particular to the inputs of a delay circuit 502 and a programmable logic array (PLA 1) 504. The delay circuit 502 is preferably constructed using two clocked D flip-flops coupled to the D0 and D1 symbol inputs which are clocked by the 16X sample clock rate. It will be appreciated that other synchronous and asynchronous delay elements, such as a one-shot can be coupled to the D0 and D1 symbol inputs to provide the required delay as well.

Demodulated data signals are periodically clocked into the delay element 502 using the 16X sample clock to provide a sequence of previous (P1 and P0) and new (N1 and N0) data signals which are coupled to the programmable logic array 504 which then compares the current set of previous and new data signals to determine when a state change occurs. The programmable logic array 504 generates a state change output signal at a first output of the array. In a second embodiment in accordance with the present invention, the programmable logic array 504 also compares the voltage amplitude values of the previous and new data signals, to generate a two bit binary magnitude signal (M1, M0) corresponding to the magnitude difference between the current set of previous and new data signals. TABLE II below provides the truth table for operation of the programmable logic array 504 of the present invention.

TABLE II

| Inputs | | | | Outputs | | |
|---|---|---|---|---|---|---|
| P1 | P0 | N1 | N0 | M1 | M0 | EDGE |
| 0 | 0 | 0 | 0 | 0 | 0 | 0 |
| 0 | 0 | 0 | 1 | 0 | 1 | 1 |
| 0 | 0 | 1 | 1 | 1 | 0 | 1 |
| 0 | 0 | 1 | 0 | 1 | 1 | 1 |
| 0 | 1 | 0 | 0 | 0 | 1 | 1 |
| 0 | 1 | 0 | 1 | 0 | 0 | 0 |
| 0 | 1 | 1 | 1 | 0 | 1 | 1 |
| 0 | 1 | 1 | 0 | 1 | 0 | 1 |
| 1 | 1 | 0 | 0 | 1 | 0 | 1 |
| 1 | 1 | 0 | 1 | 0 | 1 | 1 |
| 1 | 1 | 1 | 1 | 0 | 0 | 0 |
| 1 | 1 | 1 | 0 | 0 | 1 | 1 |
| 1 | 0 | 0 | 0 | 1 | 1 | 1 |
| 1 | 0 | 0 | 1 | 1 | 0 | 1 |
| 1 | 0 | 1 | 1 | 0 | 1 | 1 |
| 1 | 0 | 1 | 0 | 0 | 0 | 0 |

In summary, as can be seen from TABLE II, the state change and magnitude detector circuit 310 detects changes of state, identified as the EDGE signal, between the binary bit pairs of the demodulated data as well as magnitude differences, identified by the M0 and M1 values, between the binary bit pairs. The M0 and M1 values identify magnitude difference of 0 (M1 32 0, M0=0), 1 (M1=0, M0=1), 2 (M1=1, M0=0), 3 (M1=1, M0=1).

Figure 6:
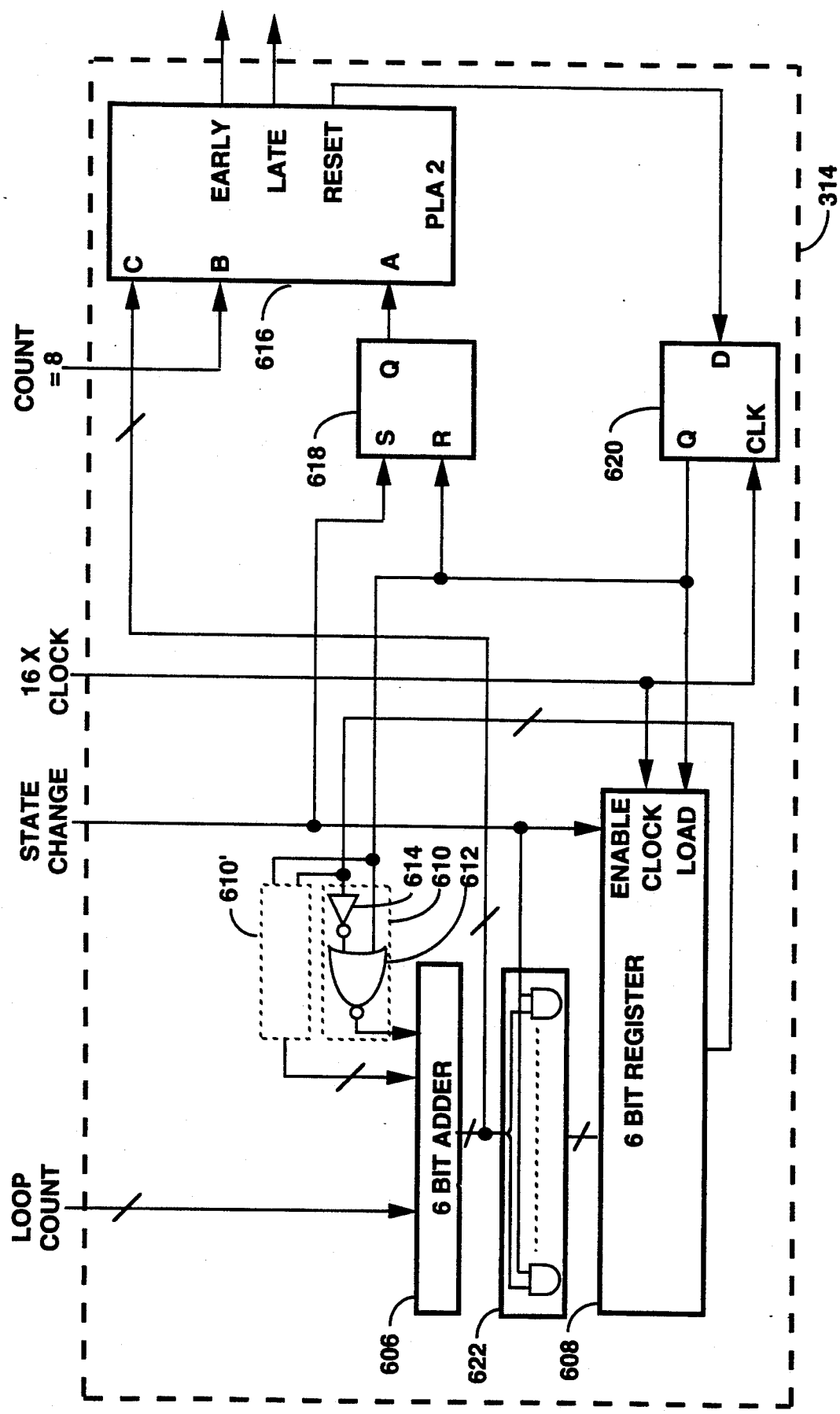
FIG. 6 is an electrical block diagram of a first embodiment of the symbol synchronization controller utilized in accordance with the present invention.

FIG. 6 is an electrical block diagram of a first embodiment of the symbol synchronization controller 314 constructed in accordance with the present invention. As described above for FIG. 3, only the state change information generated by the state change and magnitude detector circuit 310 is processed. The loop count, which represents time location information generated by the loop counter 318 is coupled to a first input of an adder 606, which is preferably an unclocked six bit binary adder which is well known in the art. The second inputs of the adder 606 are derived from six single bit data selector circuits 610–610'. The six outputs of the adder 606 are coupled to the input of a programmable logic array (PLA 2) 616, and to first inputs of AND gate array 622, which includes six AND gates. The second inputs of AND gate array 622 are coupled to the state change signal generated by the state change and magnitude detector circuit 310. The outputs of AND gate array 622 are coupled to the inputs of data register 608. Also coupled to the data register 608 is an enable input derived from the state change signal generated by state change and magnitude detector circuit 310, the 16X sample clock, and a LOAD input signal, to be described in detail below.

Coupled to the programmable logic array 616 is a count =8 input signal derived from the loop counter 318, and the Q output of a first flip-flop, such as RS flip-flip 618. The set input of RS flip-flop 618 is coupled to the change of state signal generated by state change and magnitude detector circuit 310. The reset input of RS flip-flop 618 is coupled to the Q output of a second flip-flop, such as D flip-flop 620. The Q output of D flip-flop 620 also couples to the LOAD input of data register 608. The data input of D flip-flop 620 is coupled to the RESET output of the programmable logic array 616, and the clock input is coupled to the 16X sample clock. Each single bit data selector circuit includes a NOR gate 612 and an INVERTER 614. The output of the NOR gate 612 couples to the least significant bit (LSB) of the second inputs of the adder 606. The outputs of the five NOR gates in the remaining single bit data selectors 610' each couple to a predetermined input bit of the second inputs of the adder 606. The first input of the NOR gate 612 couples to the other first inputs of the NOR gates in the single bit data selectors 610', and to the Q output of D flip-flop 620. The second input of the NOR gate 612 couples to the output of INVERTER 614. The input of INVERTER 614 couples to the least significant bit (LSB) of the output of the data register 608. The inputs to the five INVERTERs in the remaining single bit data selectors 610' each couple to a predetermined output bit of the data register 608.

In operation, the symbol synchronization controller 314 operates as follows. The loop counter 318 is initially set to −8 and is incremented one count at a time for each 16X sample clock pulse, until a count of +8 is reached. The loop count is coupled to the first input of the adder 606, which adds the loop count to the previous value stored in the data register 608, as will be described below.

In order to fully understand the operation of the symbol synchronization controller 314, several initial operating conditions must be defined. The Q output of RS flip-flop 618 and the Q output of the D flip-flop 620 are each initially assumed to be a logic zero, and the data register 608 contents is assumed to initially be set to logic zeroes. The conditions assumed occur regularly during the operation of the symbol synchronization controller 314 without the use of an initialization sequence. TABLE III below provides the truth table for operation of the programmable logic array 616 of the present invention.

TABLE III

| Inputs | | | Outputs | | |
|---|---|---|---|---|---|
| Q (618) | Count = 8 | Register Input Value | | | |
| A | B | C | EARLY | LATE | RESET |
| 0 | X | X | 0 | 0 | 0 |
| 1 | 0 | X | 0 | 0 | 0 |
| 1 | 1 | positive | 1 | 0 | 1 |
| 1 | 1 | negative | 0 | 1 | 1 |
| 1 | 1 | zero | 0 | 0 | 1 |

X = don't care

In operation, the programmable logic array 616 generates an EARLY or a LATE detection signal, and provides a LOAD of the contents of data register 608, at the end of the predetermined sampling period identified when the loop counter count equals eight (=8) following the detection of at least one edge within the predetermined sample period. The LOAD input to the data register 608 will cause the outputs of AND gate array 622 to be loaded into the data register for initialization. When the state change signal from the state change and magnitude detector circuit 310 is a logic zero, the data register is loaded with zeroes. When the state change signal is a logic one, the data register is loaded with the current loop count forming the beginning of the next integration interval. Unlike prior art binary symbol synchronizers which do not take advantage of the exact time location of individual edges, multiple edge detections are processed by the symbol synchronization controller 314 within the predetermined sampling period, which advantageously results in an integration of the time of edge detection information over the total sampling period, enabling a significantly more accurate determination of symbol synchronization and symbol center sampling.

Returning to the operation of the symbol synchronization controller 314 as shown in FIG. 6, the single symbol data selector circuits 610, 610' are enabled by the logic zero Q output of D flip-flop 620 to provide the second inputs of adder 606 the current contents of data register 608, which as has been previously described is initially set to zero. The output of the adder 606 is the sum of the current data register contents 608 when the single bit data selector circuits 610–610' are enabled and the current loop count for the current sample clock period is zero. The output of the adder 606 is only loaded into the data register 608 when a state change pulse is present at the ENABLE input of the data register 608.

When a state change is detected within the sample clock period, the contents of the data register 608 which is added to the current loop count in the adder 606 is loaded into the data register 608. As additional edge detections are detected within the predetermined sample time interval, the current loop count is added to the previous contents of the data register 608. This accumulation of state change information which is dependent upon the time location of the detected state changes results in an integration of the state change information over the total predetermined sample time interval.

When a state change is detected by the state change and magnitude detector circuit 310, the state change pulse is also coupled to the set (S) input of RS flip-flop 618, setting the Q output to a logic one at the A input of the programmable logic array 616. The current inputs to the data register 608 is also coupled to the C input of programmable logic array 616, however, the information is not processed until the end of the predetermined sample time interval, corresponding to the loop count equaling eight (=8), at which time the loop counter 318 generates a count =8 pulse at input B of the programmable logic array 616. The information is then processed as described above in Table III.

At the end of the predetermined sample time interval, either an EARLY or a LATE detection signal is generated depending upon whether or not an edge was detected within the current predetermined sample time interval, and the current contents of the data register 608. A logic one reset pulse is also generated by the programmable logic array 616 which is coupled to the data input of D flip-flop 620, setting the Q output of D flip-flop 620 to a logic one on the next 16X sample clock pulse. The Q output of D flip-flop 620 is coupled to the LOAD input of data register 608 which result in the contents of the data register 608 to be loaded with the current loop count on the next 16X sample clock pulse, and resets the Q output of RS flip-flop 618 back to a logic zero. The RESET input on RS flip-flop 618 overrides the SET input, to avoid any erroneous operation.

In summary, the symbol synchronization controller 314 tracks the time location of all edges detected within a predetermined sample time interval. This information is integrated over the total predetermined time interval, as described above, to provide an EARLY or a LATE detection signal. Depending upon the sampling resolution over the predetermined sample time interval, the adder 606 and the data register 608 may require a greater or a lesser number of bits to achieve the operation described above.

Figure 7A:
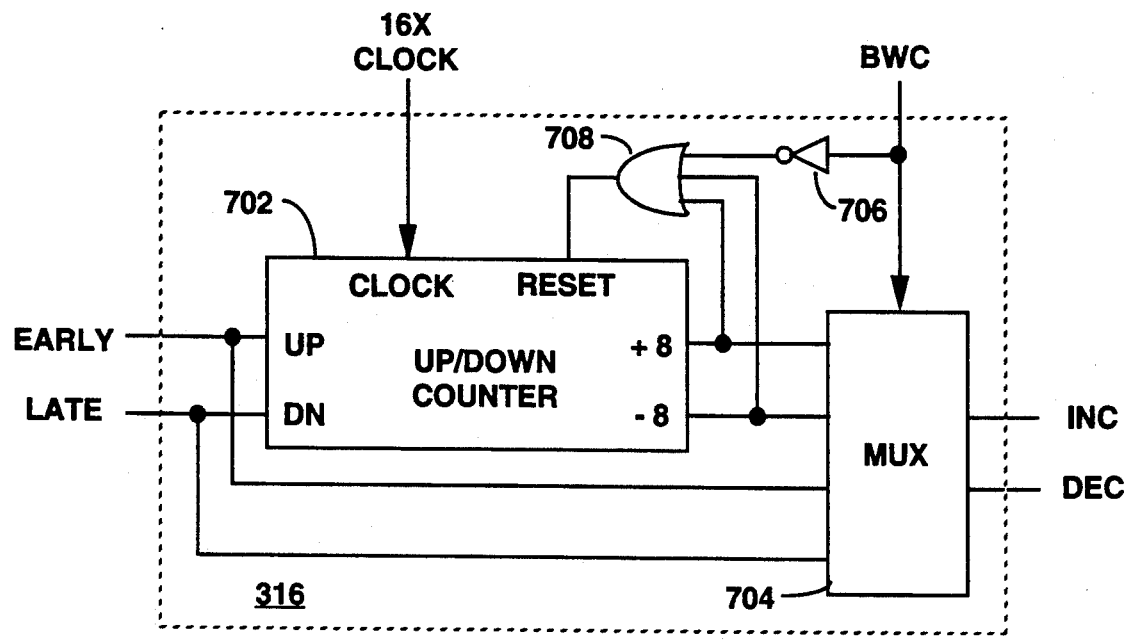
FIG. 7A is an electrical block diagram of the bandwidth controller utilized in accordance with the present invention.

FIG. 7A is an electrical block diagram of the bandwidth controller utilized in the multi-level symbol synchronizer of the present invention. The EARLY and LATE detection signals generated by the symbol synchronization controller 314 are coupled to the inputs of the bandwidth controller, and in particular to the UP and DOWN inputs of Up/Down counter 702 and inputs of multiplexer 704. Up/down counter 702 is preferably a clocked up/down counter and includes a clocked reset input and decoded outputs for the generation of a +8 count signal and a −8 count signal as will be described below. Also coupled to the bandwidth controller 316 are the 16X sample clock and a bandwidth control signal (BWC). During the symbol synchronization acquisition time interval, the bandwidth control signal is set to a logic zero which couples to multiplexer 704 and to the input of INVERTER 706. The multiplexer 704 couples the EARLY and LATE detections signals directly to the output as increment (INC) and decrement (DEC) signals. The logic zero coupled to the input of INVERTER 706 generates a logic one at the output which is coupled to one input of OR gate 708. The output of OR gate 708 then remains a logic one until the next 16X sample clock pulse which generates a +8 or −8 count, and the pulse then is coupled to the RESET input of up/down counter 702 resetting the up/down counter 702. In this manner, the up/down counter 702 is held in the reset condition during the symbol synchronization acquisition time interval.

After initial symbol synchronization is achieved, which is determined by the external controller previously described, the bandwidth control signal (BWC) is switched by the external controller to a logic one, indicating the symbol synchronization maintenance time interval is selected. The logic one bandwidth control signal is coupled to multiplexer 704 resulting in the selection of the +8 and −8 output signals from the up/down counter 702. The logic one bandwidth control signal also couples to the input of the INVERTER 706 which generates a logic zero output which is coupled to one input of OR gate 708. With the up/down counter 702 having been reset, the +8 and −8 outputs are logic zeros which also couple to inputs of OR gate 708. As a result, the output of OR gate 708 is a logic zero which disables the RESET input to up/down counter 702, enabling up/down counter 702 to count. When the up/down counter 702 is active, and an EARLY or a LATE detection signal is generated by the symbol synchronization controller 314, the up/down counter 702 is either incremented or decremented during the next 16X sample clock pulse, and will continue to do so until a count of +8 or −8 is generated. The +8 or −8 count signal is coupled to the multiplexer 704, resulting in the generation of an increment or decrement signal at the output. The +8 or −8 count signal is also coupled to the OR gate, after which the up/down counter is reset upon the next 16X sample clock pulse when a count of +8 or −8 is achieved.

Figure 7B:
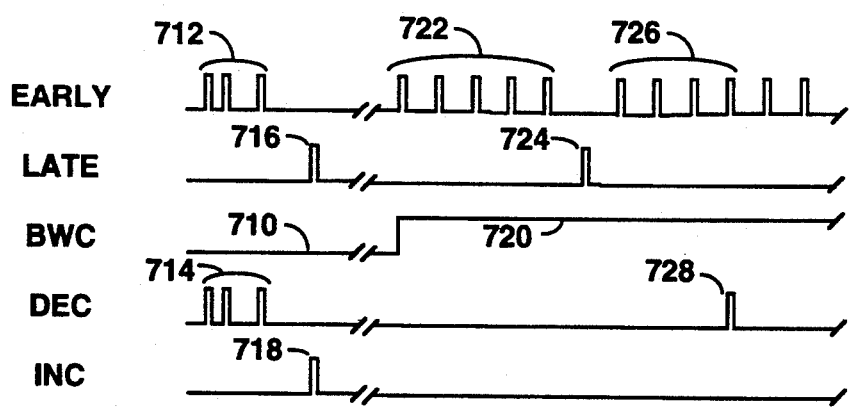
FIG. 7B is a timing diagram illustrating the operation of the bandwidth controller utilized in accordance with the present invention.

FIG. 7B is a timing diagram illustrating the operation of the bandwidth controller utilized in the multi-level symbol synchronizer in accordance with the present invention. As shown, during the symbol synchronization acquisition mode, the bandwidth control signal 710 is a logic zero. In the example shown, for each EARLY detection signal 712 generated, a corresponding decrement signal 714 is generated, and for each LATE detection signal 716, a corresponding increment signal 718 is generated. In those instances where the received symbol does not change, neither an EARLY or a LATE detection signal is generated. Following the symbol synchronization acquisition mode, a symbol synchronization maintenance mode is established. As shown, during the symbol synchronization maintenance mode, the bandwidth control signal 720 (BWC) is a logic one. In the example shown, a sequence of early detection signals 722 and 726 and a late detection signal 724 were generated before the up/down counter count reached −8, at which time a decrement signal 728 was generated. In the symbol synchronization maintenance mode, adjustments to the clock generally occur infrequently, until the drift between the transmitter and the receiver timing becomes significant, such as an offset of one-sixteenth of a symbol.

Figure 8A:
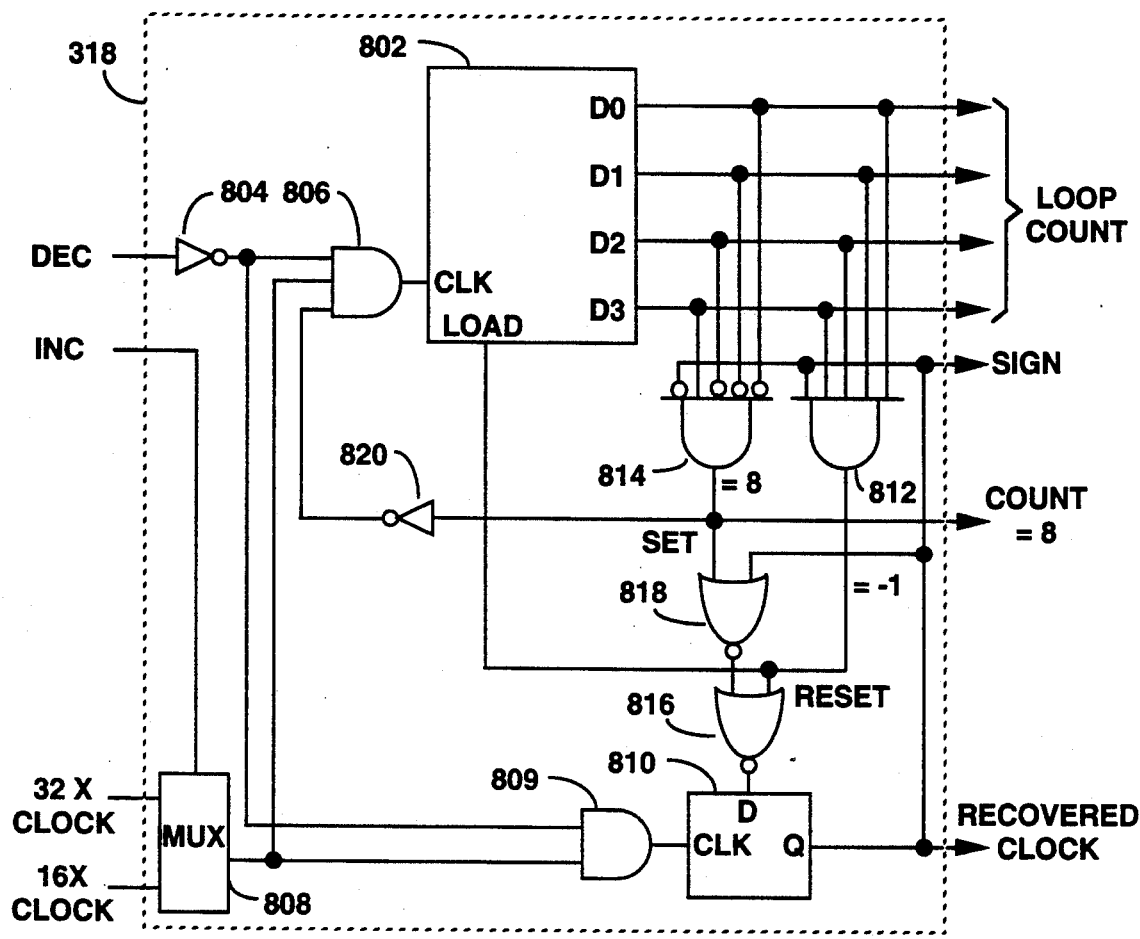
FIG. 8A is an electrical block diagram of the loop counter utilized in accordance with the present invention.

FIG. 8A is an electrical block diagram of the loop counter utilized in the multi-level symbol synchronizer in accordance with the present invention. The loop counter 318 includes a binary counter 802, preferably a four bit synchronous binary counter having a clocked load capability. The decrement signal from the bandwidth controller 316 is coupled to the input of an INVERTER 804. The output of INVERTER 804 couples to one input of AND gate 806 and one input of AND gate 809. The increment signal from the bandwidth controller 316 is coupled to the control input of multiplexer 808. 16X and 32X sample clock pulses coupled to the data inputs of multiplexer 808. The output of multiplexer 808 couples to a second input of AND gate 806 and the second input of AND gate 809. The output of AND gate 809 couples to the clock input of D flip-flop 810. The Q output of D flip-flop 810 provides the recovered clock signal and the SIGN signal, as will be described in detail below. The D0, D1, D2 and D3 data outputs of counter 802 couple directly to four inputs of AND gate 812. A fifth input to AND gate 812 couples to the Q output of D flip-flop 810. The D0, D1 and D2 data outputs of counter 802, and the SIGN output of D flip-flop 810 are inverted and couple to inputs of AND gate 814. The D3 data output of counter 802 couples to a fifth input of AND gate 814. The output of AND gate 812 couples to a first input of NOR gate 816 and to the LOAD input of counter 802. The output of AND gate 814 couples to a first input of NOR gate 818 and to the input of INVERTER 820. The second input to NOR gate 818 is coupled to the Q output of D flip-flop 810. The output of NOR gate 818 couples to the second input of NOR gate 816. The output of NOR gate 816 couples to the data input of D flip-flop 810. The output of INVERTER 820 couples to a third input of AND gate 806.

In operation, the output of AND gate 812 provides a reset pulse, setting the Q output of D flip-flop 810 to a logic zero when the counter count equals a minus one, and also providing a LOAD signal to counter 802 to enable loading a value of binary 0001 into the counter. The output of AND gate 814 provides a set pulse, setting the Q output of D flip-flop 810 to a logic one when the counter count equals plus eight, and also provides an inhibit count pulse to counter 802 through INVERTER 820.

The operation of the loop counter is best understood by considering TABLE IV which shows the counting sequence.

TABLE IV

| Sign | D3 | D2 | D1 | D0 | Count |
|---|---|---|---|---|---|
| 0 (+) | 0 | 0 | 0 | 1 | 1 |
| 0 | 0 | 0 | 1 | 0 | 2 |
| 0 | 0 | 0 | 1 | 1 | 3 |
| 0 | 0 | 1 | 0 | 0 | 4 |
| 0 | 0 | 1 | 0 | 1 | 5 |
| 0 | 0 | 1 | 1 | 0 | 6 |
| 0 | 0 | 1 | 1 | 1 | 7 |
| 0 (+) | 1 | 0 | 0 | 0 | 8 |
| 1 (−) | 1 | 0 | 0 | 0 | −8 |
| 1 | 1 | 0 | 0 | 1 | −7 |
| 1 | 1 | 0 | 1 | 0 | −6 |
| 1 | 1 | 0 | 1 | 1 | −5 |
| 1 | 1 | 1 | 0 | 0 | −4 |
| 1 | 1 | 1 | 0 | 1 | −3 |
| 1 | 1 | 1 | 1 | 0 | −2 |
| 1 (−) | 1 | 1 | 1 | 1 | −1 |

As can be seen from TABLE IV above, counter 802 is a modified four bit binary counter which counts from 1 (binary 0001 and sign bit 0) to −1 (binary 1111 and sign bit 1). In normal operation, the INC and DEC inputs to loop counter 318 are logic zeroes. The low INC input selects the 16X sample clock using multiplexer 808 which is coupled to AND gate 806. When the counter is in any state other than =8, the output of AND gate 814 is also low. Therefore the outputs of INVERTERS 804 and 820 are logic ones, resulting in the 16X sample clock clocking counter 802. Counter 802 is advanced for each 16X sample clock pulse until the count equals eight (=8). When the count equals eight, a logic one is generated at the output of AND gate 814 which results in a logic zero generated at the output of INVERTER 820, disabling the clock input to counter 802, and providing a SET enable for D flip-flop 810. On the next 16X sample clock pulse, the output of D flip-flop 810 is set to a logic one indicating a change of sign to minus, and releasing the clock inhibit to counter 802. Counter 802 then continues to count until minus one is reached. When the count equals minus one, a logic one is generated at the output of AND gate 812 providing a RESET enable for D flip-flop 810, and a LOAD enable to counter 802. On the next 16X sample clock pulse, the output of D flip-flop 810 is set to a logic zero indicating a change of sign to plus, and a count of one (binary 0001) is loaded into counter 802. It will be appreciated by one of ordinary skill in the art that NOR gates 816 and 818 and D flip-flop 810 can be implemented using a clocked R-S flip-flop as well.

Figure 8B:
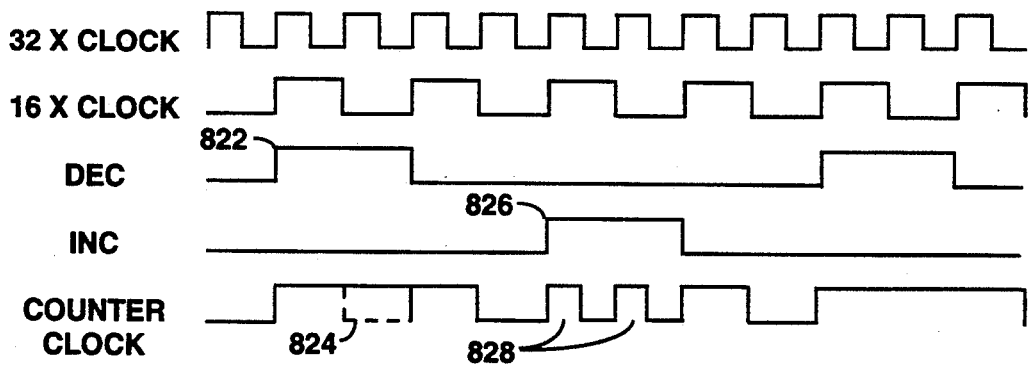
FIG. 8B is a timing diagram illustrating the operation of the loop counter utilized in accordance with the present invention.

FIG. 8B is a timing diagram illustrating the operation of the loop counter utilized in accordance with the present invention. When a decrement (DEC) signal 822 is generated by bandwidth controller 316, a logic one is coupled to the input of inverter 804 which then couples a logic zero to one input of AND gate 806 inhibiting the sample clock pulse 824 to counter 802 retarding the recovered clock signal by one 16X sample clock period relative to the received data. The DEC signal also causes flip-flop 810 to hold the present sign value. By maintaining the decrement signal high for additional sample clock time periods, additional adjustment of the recovered clock is possible.

Figure 9A:
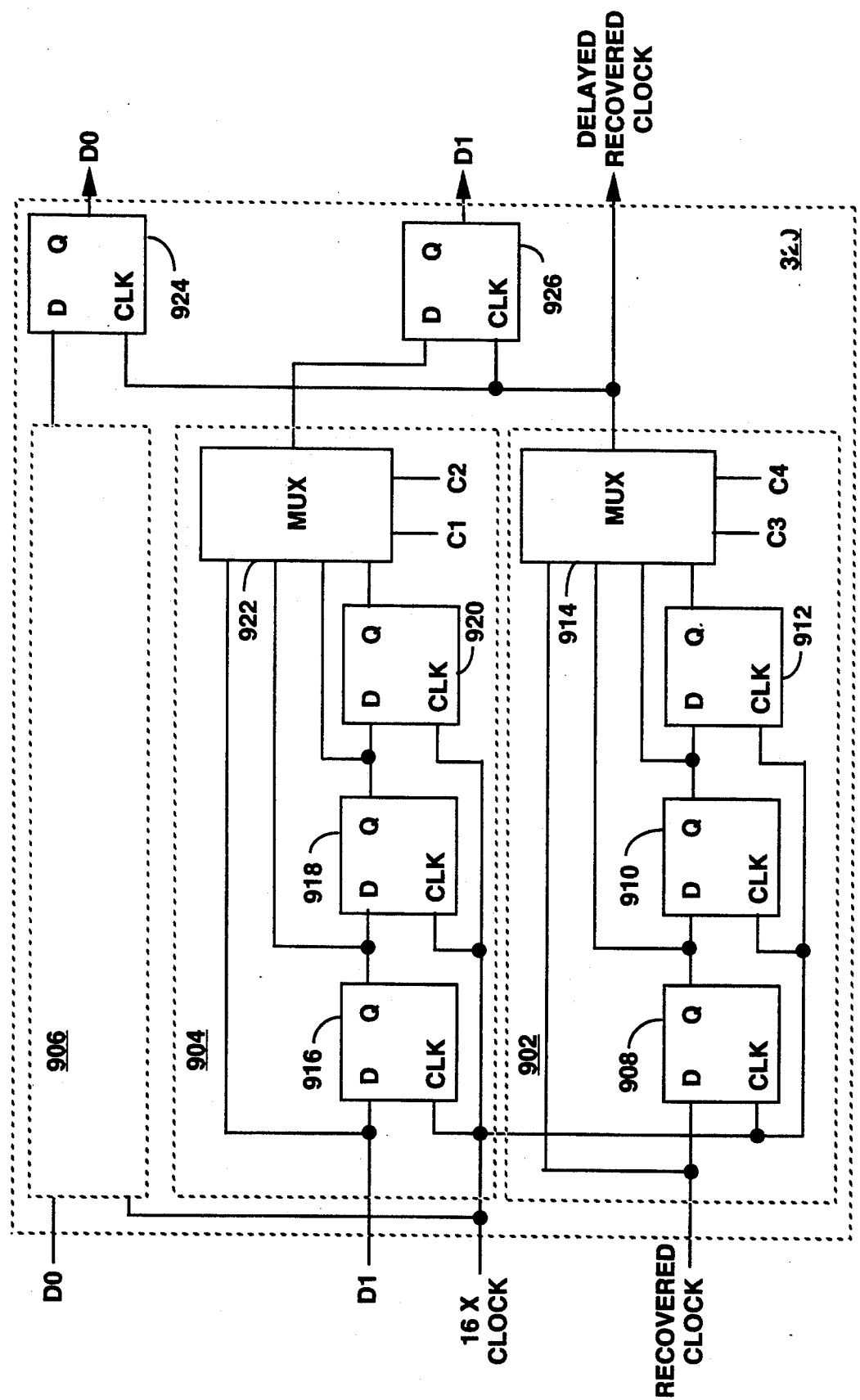
FIG. 9A is an electrical block diagram of the symbol recovery circuit utilized in accordance with the present invention.

When an increment (INC) signal 826 is generated in bandwidth controller 316, a logic one is coupled to the SELECT input of multiplexer 808 which then couples the 32X sample clock 828 to the input of counter 802, thereby advancing the counter count twice during during a 16X sample clock period, advancing the recovered clock signal two 16X sample clock periods relative to the received data. By maintaining the increment signal high for additional sample clock time periods, additional adjustment of the recovered clock is possible. With the addition of other clock inputs, such as a 64X sample clock, adjustments of four 16X sample clock periods can be provided as well. FIG. 9A is an electrical block diagram of the symbol recovery circuit 320 utilized in accordance with the present invention. The symbol recovery circuit 320 includes, but is not necessarily limited to a recovered clock processing section 902 and two bit processing sections 904 and 906. The recovered clock processing section 902 includes, as an example, three D flip-flops 908, 910 and 912 and a multiplexer 914. The recovered clock signal generated by the loop counter 318 is coupled to the data input of D flip-flop 908 and to a first data input of multiplexer 914. The Q output of D flip-flop 908 couples to the data input of D flip-flop 910, and to a second data input of multiplexer 914. The Q output of D flip-flop 910 couples to the data input of D flip-flop 912, and to a third data input of multiplexer 914. The Q output of D flip-flop 912 couples to a fourth data input of multiplexer 914. The clock inputs of D flip-flops 908, 910 and 912 are coupled to the 16X sample clock. Control inputs C3 and C4 of multiplexer 914 enable the selection of one of the four data inputs thereby providing a delayed recovered clock signal at the output of multiplexer 914 which is in-phase (no delay), or delayed one, two or three 16x sample clock pulses relative to the recovered clock signal generated by loop counter 318.

The first bit processing section 904 includes, but is not limited necessarily to, three D flip flops 916, 918 and 920 and a multiplexer 922. The D1 bit signal generated by the A/D converter 308 is coupled to the data input of D flip-flop 916 and to a first data input of multiplexer 922. The Q output of D flip-flop 916 couples to the data input of D flip-flop 918, and to a second data input of multiplexer 922. The Q output of D flip-flop 918 couples to the data input of D flip-flop 920, and to a third data input of multiplexer 922. The Q output of D flip-flop 920 couples to a fourth data input of multiplexer 922. The clock inputs of D flip-flops 916, 918 and 920 are coupled to the 16X sample clock. Control inputs C1 and C2 of multiplexer 922 enable the selection of one of the four data inputs thereby providing a D1 bit signal at the output of multiplexer 922 which is in-phase, or delayed one, two or three 16x sample clock pulses relative to the D1 bit signal generated by A/D converter 308. The construction of the second bit processing section 906 is identical to that described for the first bit processing section 904, and uses the same C1, C2 control values as coupled to the first bit processing section 904.

The output of the second bit processing section 906 couples to the data input of D flip-flop 924. The output of the first bit processing section 904 couples to the data input of D flip-flop 926. The delayed recovered clock output of the recovered clock processing circuit 902 couples to the clock inputs of D flip-flop 924 and D flip-flop 926. The Q outputs of D flip-flops 924 and 926 provide the recovered data symbols which can be selectively adjusted in phase relative to the delayed recovered clock signal, the function of which is described below.

Figure 9B:
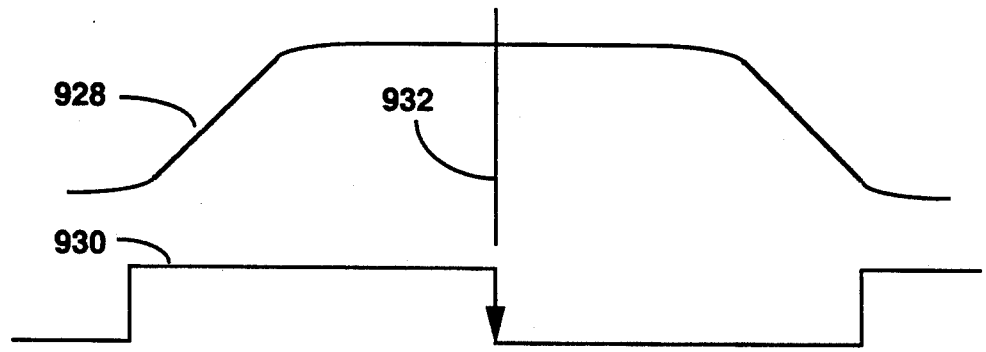
FIGS. 9B-9D are timing diagrams illustrating the operation of the symbol recovery circuit utilized in accordance with the present invention.
Figure 9C:
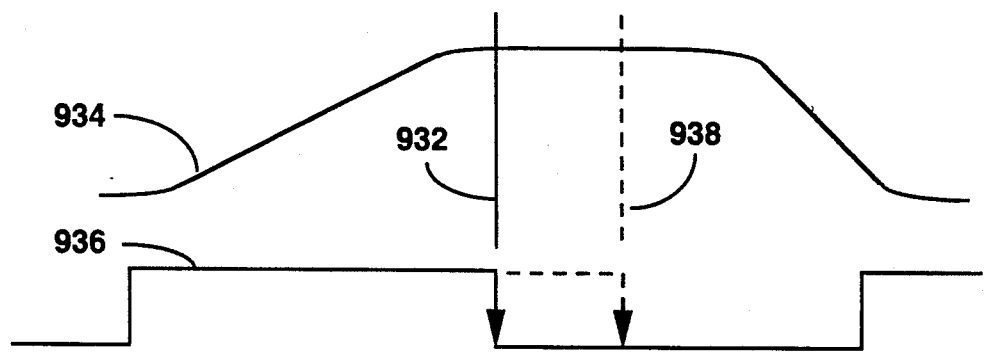
Figure 9D:
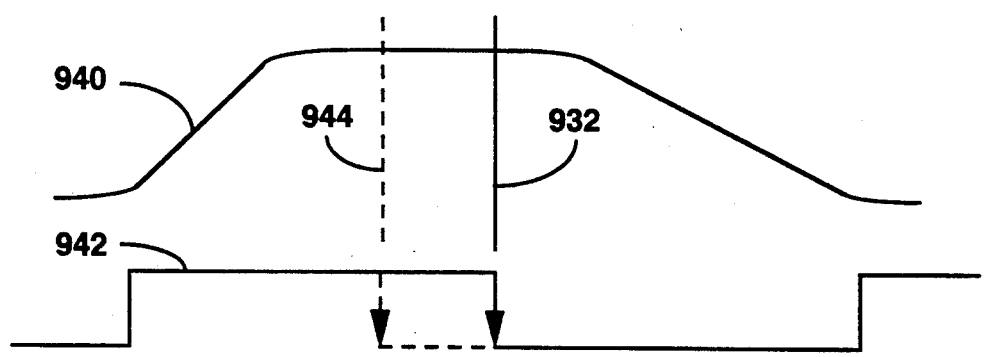

FIGS. 9B-9D are timing diagrams illustrating the operation of the symbol recovery circuit utilized in accordance with the present invention. As shown in FIG. 9B, the demodulated data signal 928 present at the output of the receiver is synchronized with the recovered clock 930, and the rise and fall times of the demodulated data bits are such that there is no ambiguity in sampling the recovered data symbols at the symbol center 932 of the demodulated data signal.

As shown in FIG. 9C, the demodulated data signal 934 present at the output of the receiver is synchronized with the recovered clock 936, however the rise time of the demodulated data bits are such that there can be ambiguity in sampling the recovered data symbols at the symbol center 932 of the demodulated data signal. As a result, the recovered clock signal 938 can be delayed relative to the demodulated data signal to insure correct sampling of the demodulated data signal.

As shown in FIG. 9C, the demodulated data signal 940 present at the output of the receiver is synchronized with the recovered clock 942, however the fall time of the demodulated data bits are such that there can be ambiguity in sampling the recovered data symbols at the symbol center 932 of the demodulated data signal. As a result, the recovered clock signal 944 can advanced relative to the demodulated data signal, by delaying the recovered data symbols, to insure correct sampling of the demodulated data signal. The decision to advance or delay the recovered clock signal relative to the recovered data symbols is made at the time of manufacture of the receiver, and the selection information (C1, C2, C3, and C4) are preferably programmed into a non-volatile memory so as to maintain the selection information when the receiver is turned off.

Figure 10A:
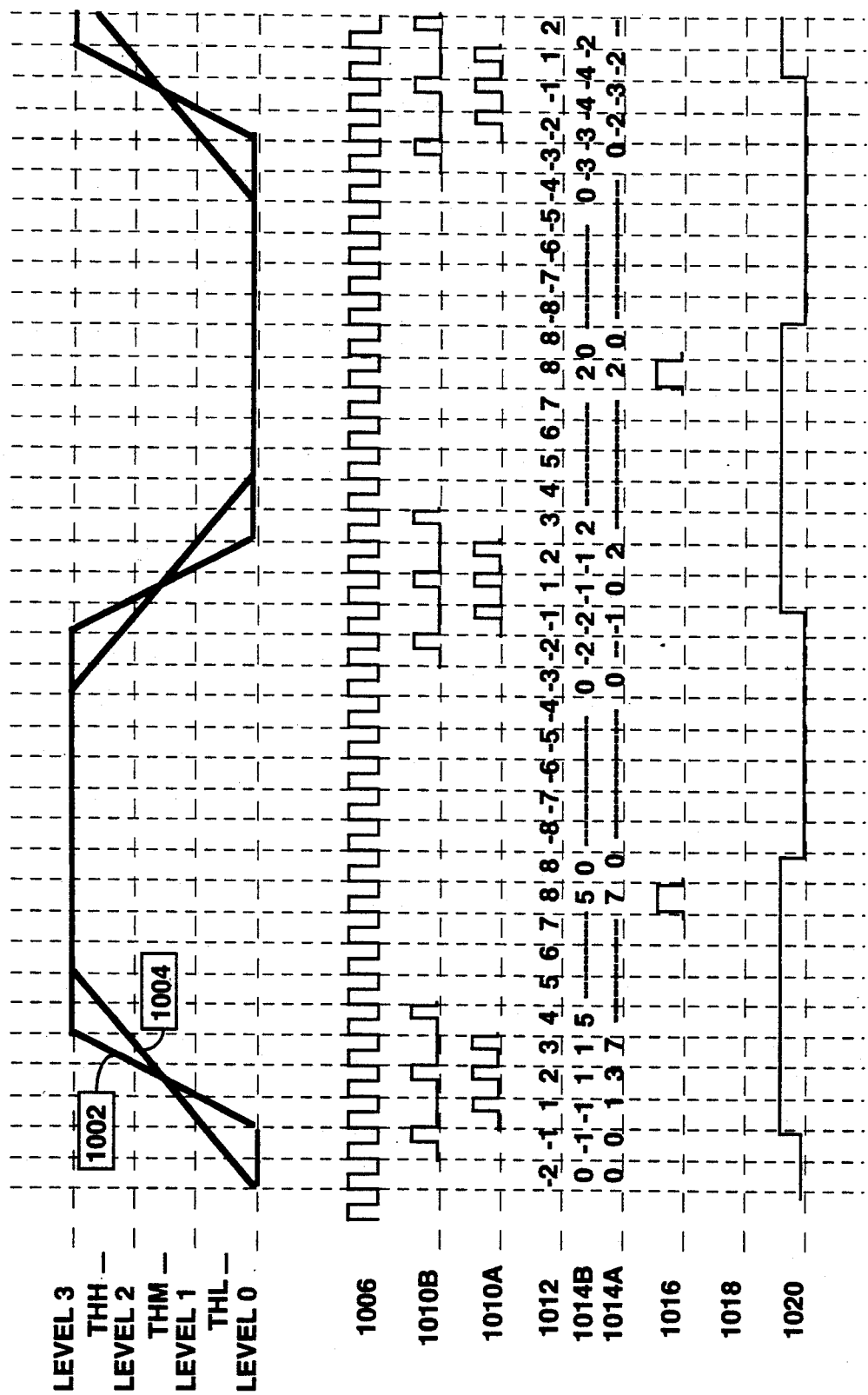
FIGS. 10A and 10B are timing diagrams illustrating the operation of the multi-level symbol synchronizer utilizing the first embodiment of the synchronization controller in accordance with the present invention.
Figure 10B:
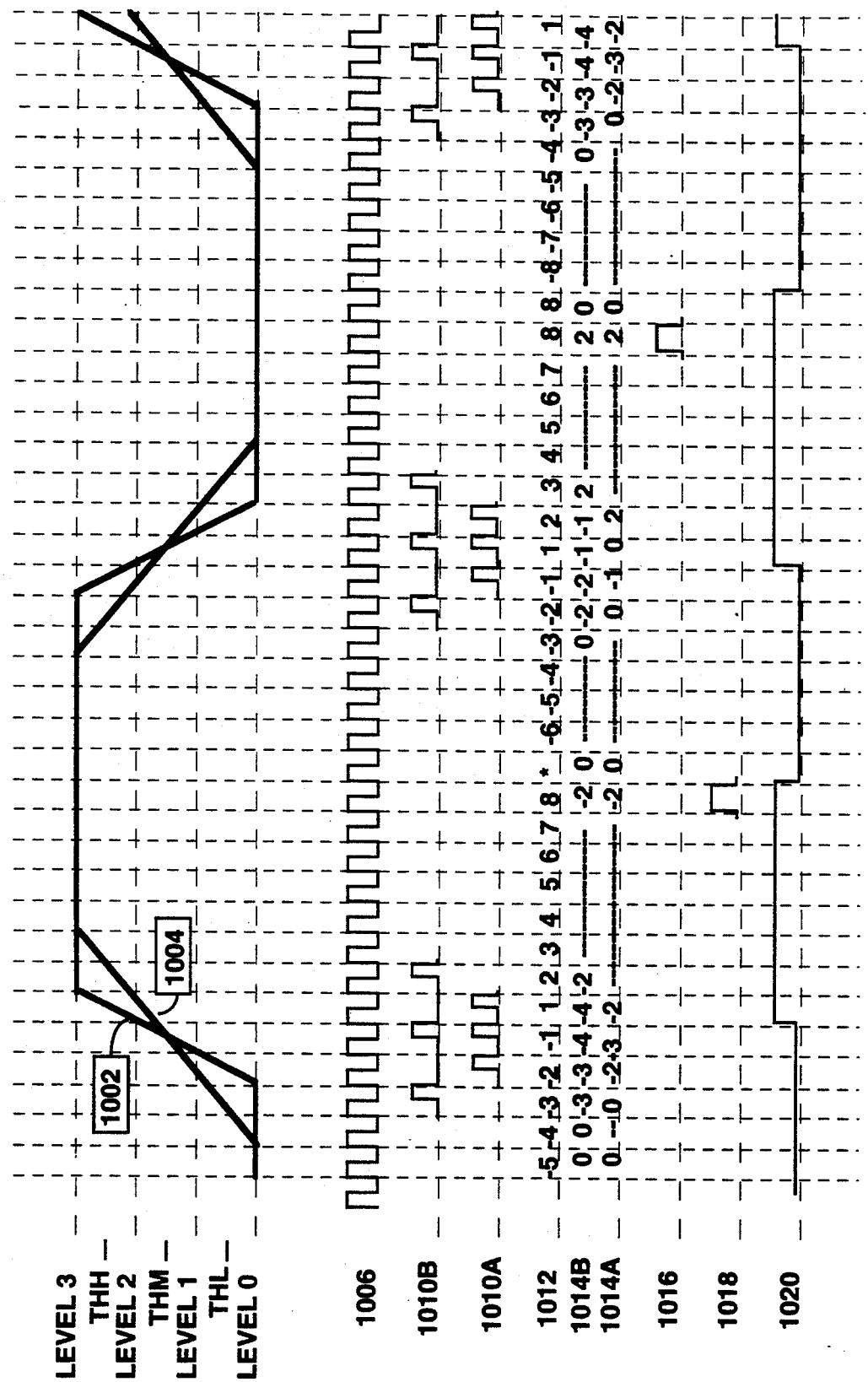

FIGS. 10A-10B are timing diagrams illustrating the operation of the multi-level symbol synchronizer in accordance with the present invention. A multi-level signal is represented for example purposes as a signal swinging between the minimum voltage level and the maximum voltage level. By way of example, the signal is shown as a first data signal 1002 having relatively rapid rise and fall times, and a second data signal 1004 having somewhat slower rise and fall times. Also illustrated is the sample clock 1006 at each detected state change 1010, the time count 1012 generated by the loop counter, the data register count 1014, the decrement signal 1016, the increment signal 1018, and the recovered clock signal 1020 during synchronization. The time count is shown in FIG. 10A as starting at −2, which as shown, indicates the reference clock signal is in relative synchronization with the first data signal 1002 or the second data signal 1004.

Referring to the first data signal 1002 as shown in FIG. 10A, state changes 1010A are sequentially detected during time counts 1012 of +1, +2 and +3. The data register 1014A contents which is initially 0 becomes +1 during time count 1012 of +1, +3 during time count 1012 of +2 and +7 during time count 1012 of +3 when only the time count 1012 is added to the previous data register contents and loaded into the data register, as described above. The data register 1014A contents then remains constant through the +8 count of the loop counter count 1012. Since the data register 1014A contents is positive when the loop count reaches +8, a decrement signal 1016 is generated during the loop count =8 cycle. The loop counter count 1012 is suspended, i.e. the count remains at +8 extending the recovered clock 1020 level at a logic one for an additional sample clock time interval, and the data register 1014A contents is then reset to zero. On the next sample clock pulse the time count becomes −8 and the recovered clock level becomes a logic zero. The data register 1014A contents remains reset to 0 until the next state change 1010A detections occurs, at which time the time count 1012 is again added to the data register contents as described above. FIGS. 10A and 10B show the operation of the symbol synchronizer over a period of four recovered data symbols.

FIG. 10A also indicates that the state changes 1010B occur in a non-continuous sequence due to the slower rise time of the second data signal 1004. Shown also are each state change 1010B, as well as the data register 1014B contents corresponding thereto. As can be seen during the first recovered clock period in FIG. 10B, when the loop counter count reaches +8, the data register 1014B contents is negative, a −2, resulting in an increment signal 1018 being generated on the next sample clock pulse. The asterisk (*) in the count of loop counter 1012, indicates the loop counter count is advanced to −8 and then −7 during the increment pulse time interval.

As will be observed from the examples of FIG. 10A and 10B, adjustments to the recovered clock signal are made by integrating the total number of state change detections over the predetermined loop counter time interval which begins at a count of −8 and ends with a count of +8. In this manner, the symbol synchronizer in accordance with the present invention provides recovered clock adjustments which are independent of the rise or fall times of the multi-level data signal, as shown.

Figure 11:
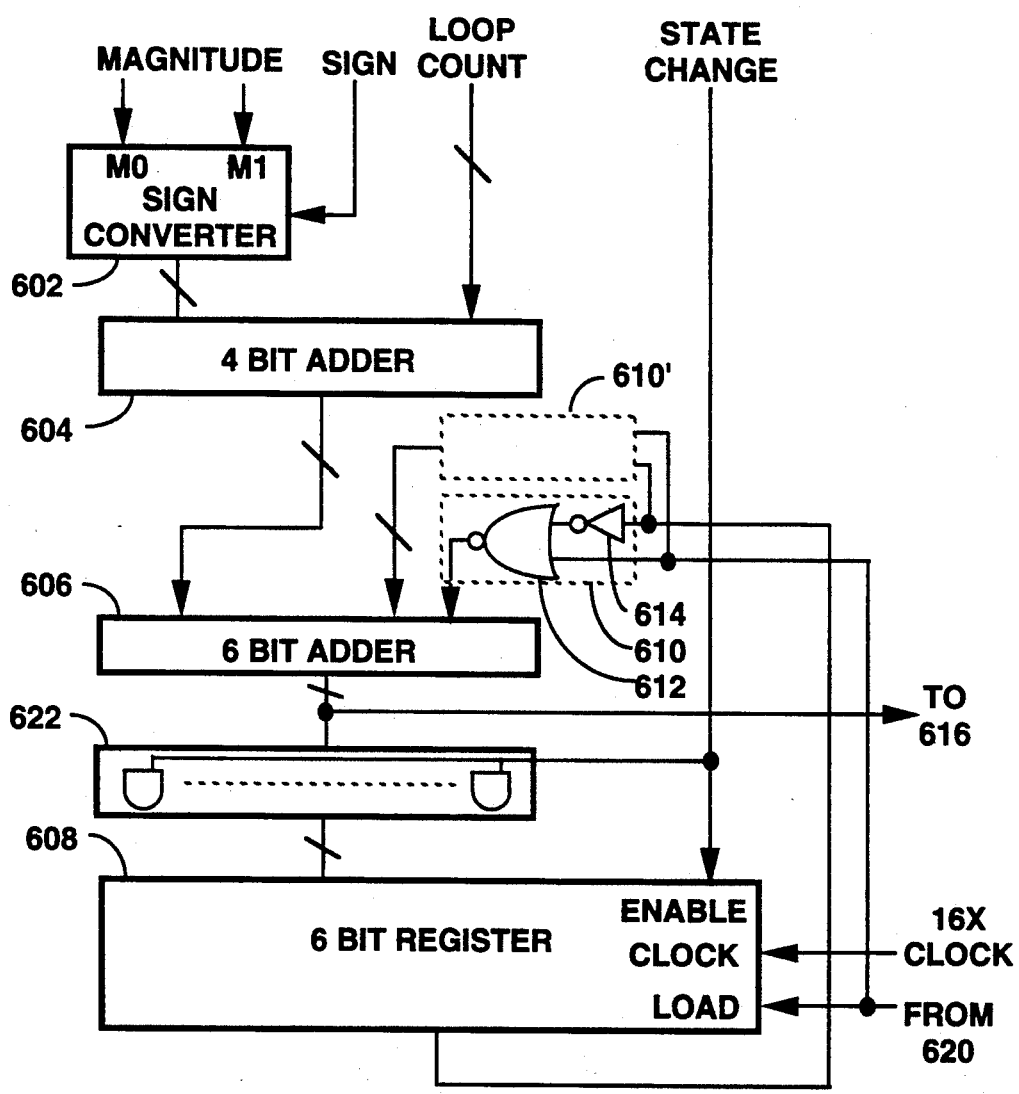
FIG. 11 is an electrical block diagram of a portion of the second embodiment of the symbol synchronization controller utilized in accordance with the present invention.

In a second embodiment of the symbol synchronization controller utilized in accordance with the present invention, as shown in FIG. 11, a sign converter 602 and the first adder 604, to be described below, are utilized to assist in the identification of the symbol edge, which is utilized to process the magnitude information, in addition to the time location information. In the second embodiment, the symbol synchronization controller 314 includes a sign converter circuit 602, as shown in FIG. 11, which receives the two bit binary magnitude input from the state change and magnitude detector circuit 310, and a sign input from the loop counter 318. The output of the sign converter 602 is a four bit binary word for a four level demodulated data signal which couples to a first input of an adder 604. The adder 604 is preferably an unclocked four bit binary adder, as described above for adder 606. The second input of the adder 604 is the loop count generated by the loop counter 318, which in the first embodiment of the symbol synchronization controller was coupled to the input of adder 606, as shown in FIG. 6.

Returning to FIG. 11, in operation, the sign converter 602 assigns a sign to the two bit binary magnitude signal (M1, M0) which corresponds to the sign bit generated by the loop counter 318 for each sample clock period. The resultant signed magnitude signal (in two's complement form) is added to the current loop count in first adder 604. Normally, the output of the first adder 604 is the current loop count, unless a state change, or symbol edge, has been detected. When a symbol edge is detected, the value of the magnitude change can be one, two or three depending on the previous symbol and next symbol states, and the rate of rise or fall of the symbol edge during the sample time interval, as described above. The magnitude and loop count information is added by adder 604, and then further added to the contents of data register 608 in adder 606, as described above, producing an accumulation which is a function of not only the time location of each edge detected, but which includes the value indicating the magnitude of the change as well. Such operation is advantageous, especially in the symbol synchronization maintenance mode, to be described below with FIG. 12.

Figure 12:
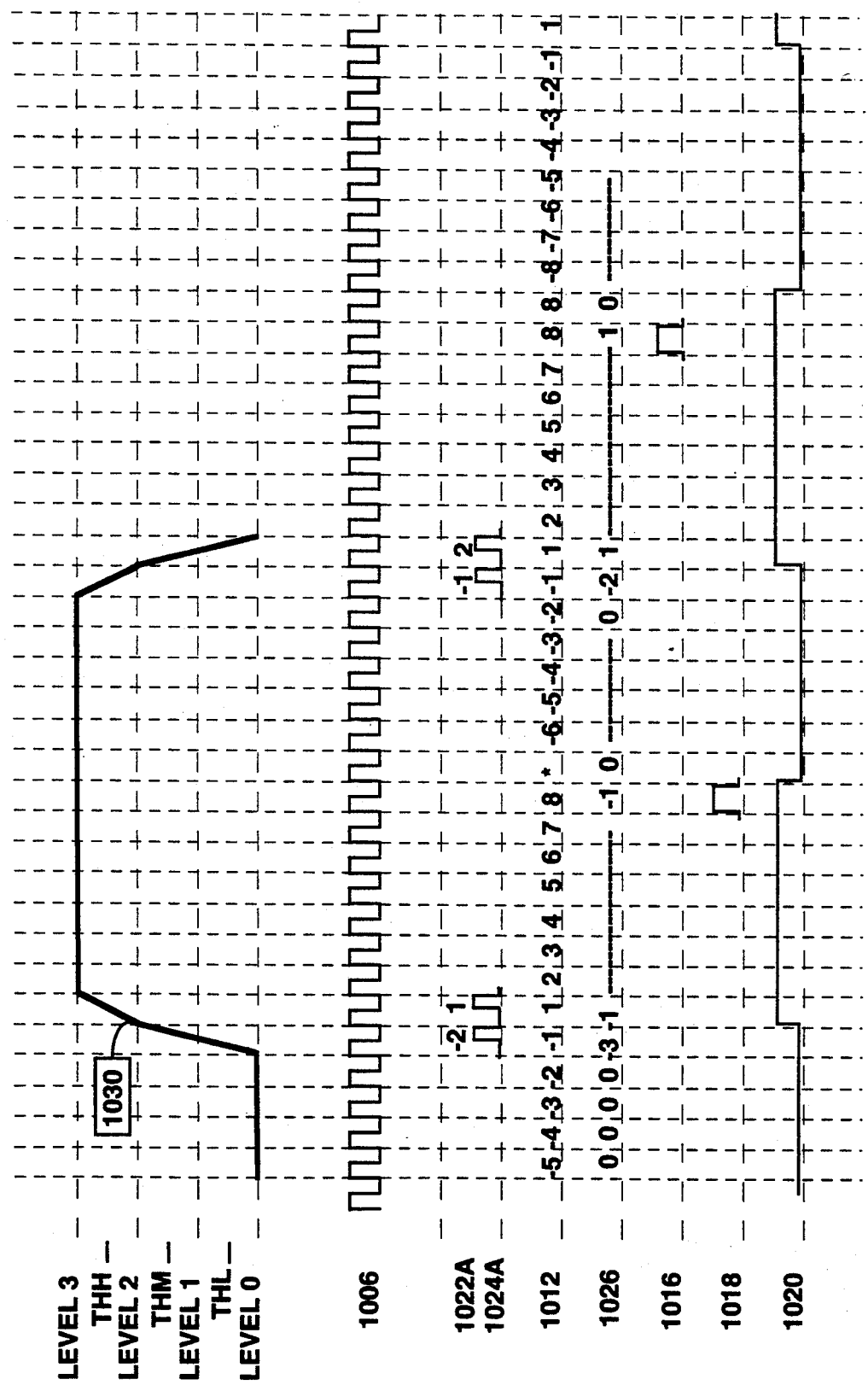
FIG. 12 is a timing diagram illustrating the operation of the multi-level symbol synchronizer utilizing the second embodiment of the synchronization controller in accordance with the present invention.

FIG. 12 illustrates a timing diagram illustrating the operation of the multi-level symbol synchronizer utilizing the second embodiment of the synchronization controller in accordance with the present invention, and in particular the effect of adding the magnitude difference with the loop count into the data register to determine the adjustment signal to be generated. As shown in FIG. 12, the demodulated signal has a non-linear rise, such as an exponential rise generated in the data filter of the demodulator section of the receiver. The exponential rise results in a magnitude difference 1022A of 2 during the loop counter count 1012 equalling −1, and a magnitude difference 1022A of 1 during the loop counter count of +1. The magnitude difference is added to the loop counter count, and the data register contents 1026 becomes a non-zero number, which in the example shown, is a −1 [(−2 magnitude change during time location −1 and +1 magnitude change during time location +1 = −1) indicating an increment signal is to be generated to adjust the loop count, unlike FIG. 10A, which because the rise was distributed over three time intervals indicated a decrement signal was to be generated.

In summary, by adding the magnitude difference to the loop counter count which indicates the time location of the state change, the time location information is weighted, and provides a more positive indication of the adjustment signal which should be generated, due to compensation being provided by the symbol synchronization controller due to waveshaping of the recovered symbol signal.

Figure 13:
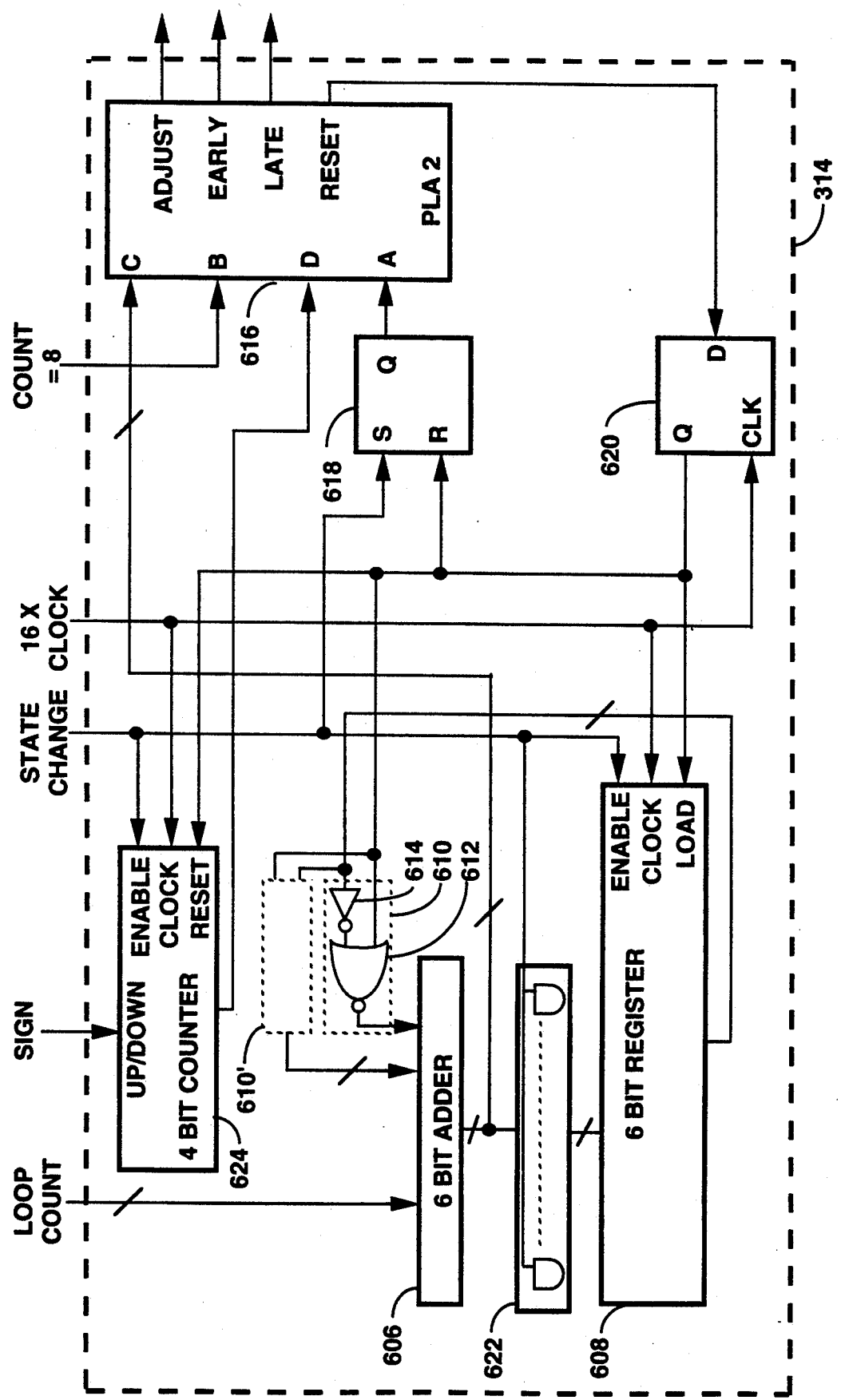
FIG. 13 is an electrical block diagram of a third embodiment of the symbol synchronization controller utilized in accordance with the present invention.

FIG. 13 is an electrical block diagram of a third embodiment of the symbol synchronization controller utilized in accordance with the present invention. FIG. 13 is identical to FIG. 6 except that an up/down counter 624 is added as shown. In this embodiment, the sign bit from loop counter 318 is coupled to the up/down input of the up/down counter 624. The change of state signal is coupled to an ENABLE input, the 16X sample clock is coupled to the clock input, and the Q output of D flip-flop 620 is coupled to the RESET input of the up/down counter 624.

In operation, the current sign bit, which as described above is either a logic zero or a logic one, controls the direction of the count (logic zero equals up). When a change of state is detected, the state change signal is coupled to the ENABLE input of the up/down counter 624 and allows the counter to count. When a state change is detected during the negative portion of the recovered clock period, the counter counts down one count to −1 when initially set to zero. When a state change is detected during the positive portion of the recovered clock period, the counter counts up one count to +1 when initially set to zero. In this manner, the number of state changes, or edge detections which occur during the negative and positive portions of the recovered clock period are integrated over the clock period. The accumulated state change value is utilized to determine the correction applied to the loop counter during the symbol synchronization acquisition mode of operation, as shown in TABLE V below.

TABLE V

| Edge Count D | Count = 8 B | Adjustment Value |
|---|---|---|
|  |  | 0 |
| X | 0 | 0 |
| EC ≦ \|1\| | 1 | ±N/16 |
| EC > \|1\| | 1 | ±N/EC*16 |

As shown in TABLE V, when the loop counter count has not reached +8, the value of the adjustment signal (ADJUST) is zero, as no adjustment is to be made. When the loop counter count = +8, and the absolute value of the accumulated edge count is less than or equal to one, the adjustment signal is set to the value of the accumulated time location values input into the register 608. Thus, if for example, a next zero value is accumulated such as when two state changes are detected over the negative portion of the recovered clock period, and two state changes are detected over the positive portion of the recovered clock period, a net one value such as when two state changes are detected over the negative portion of the recovered clock period, and one state change is detected over the positive portion of the recovered clock period, the level of adjustment of the loop count is determined by the accumulated time location value in register 624. When the accumulated edge count is greater than one, the level of adjustment of the loop counter is determined by dividing the accumulated time location value by the edge count value compute the average time location value of the edges detected, either positive, or negative. In the preferred embodiment, the complexity of the circuitry required to implement the PLA is minimized by limiting the division to such values as two or four. In this manner, a simple shift register can be utilized to determine the average time location value by simply providing a shift in the register contents by one or two bits. In addition, the total adjustment values are preferably limited to values of one, two and four, thereby limiting the maximum adjustment applied in any sampling time interval to four sample clock periods, or one-half the total recovered clock time interval. In this manner, a very rapid adjustment of the recovered clock phase can be made in a very short period of time. The resultant adjustment value is coupled to the bandwidth controller which controls the adjustment of the loop counter count, as will be described below.

Figure 14:
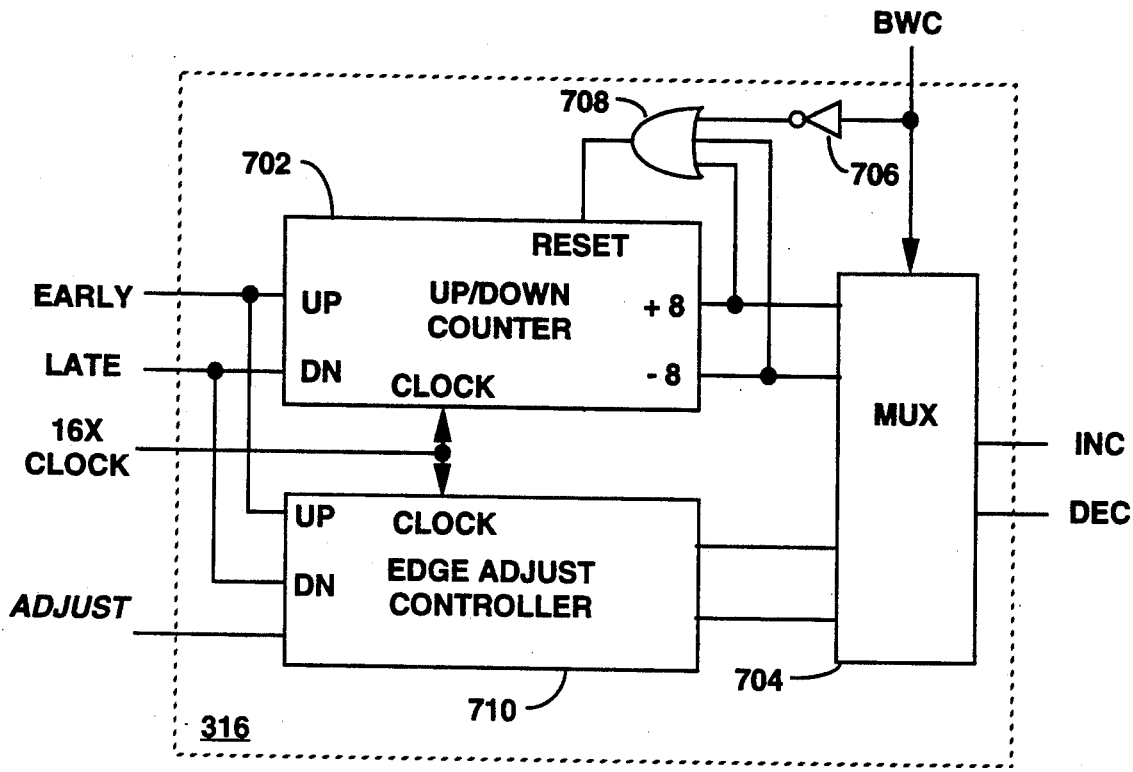
FIG. 14 is an electrical block diagram of the bandwidth controller utilized with the third embodiment of the synchronization controller in accordance with the present invention.

FIG. 14 is an electrical block diagram illustrating the bandwidth controller utilized with the third embodiment of the synchronization controller in accordance with the present invention. As shown in FIG. 14, the bandwidth controller 316 is similar to that described in FIG. 7A above, except for the addition of an edge adjustment controller 710. The edge adjustment controller has inputs coupled to the EARLY, LATE and ADJUST signals from the synchronization controller 314. Also coupled to the edge adjustment controller is the 16X sample clock. The outputs of the edge adjustment controller 710 couple to the multiplexer 704. The edge adjustment controller 710 couples the EARLY and LATE signals directly to the multiplexor 704 when only a single time interval adjustment is required. When more than a single time interval adjustment is required, the edge adjustment controller includes a down counter (not shown) to provide counts of two and four which are set by the ADJUST signal, thereby controlling the number of EARLY and LATE adjustment signals which are coupled into the multiplexor 704, to enable multiple adjustments of the loop counter count.

In summary, when state changes are detected, the time location of the state changes are accumulated within a data register. At the end of the predetermined time interval, the register contents is evaluated to determine whether the loop counter count should be advanced, retarded, or unchanged, after which the data register contents is reset to zero. The symbol synchronizer in accordance with the present invention is capable of recognizing multiple state changes, and by integrating the time location of the state changes over a predetermined time period, a decision to adjust the recovered clock relative to the incoming demodulated data signals is made as shown and described above. In the symbol synchronization acquisition mode of operation, either single or multiple adjustments of the recovered clock can be made. In the symbol synchronization maintenance mode of operation, the magnitude of the state change can be utilized together with the time location information to provide an additional level of adjustment of the recovered clock signal.

Figure 15:
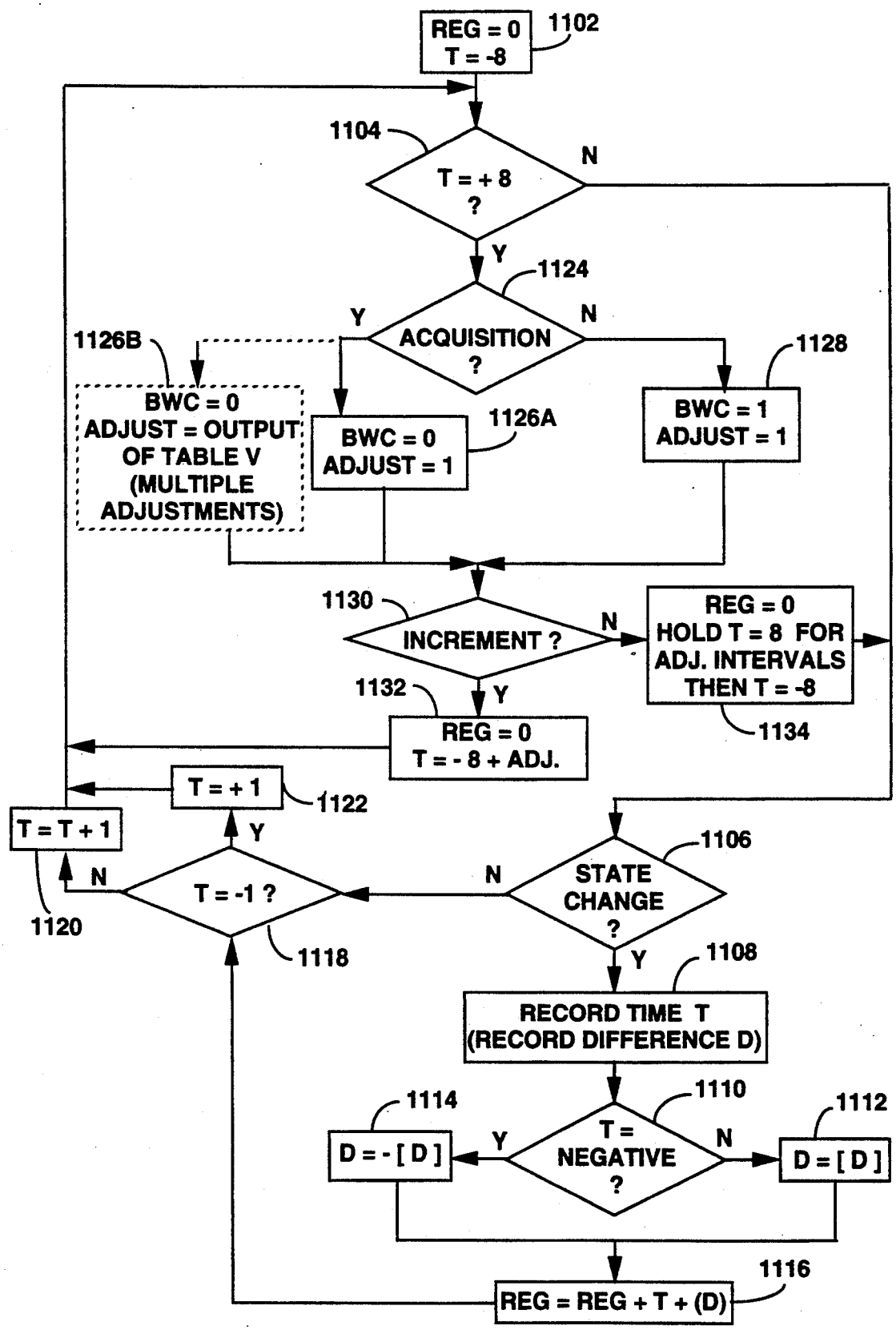
FIG. 15 is a flow chart illustrating the operation of the multi-level symbol synchronizer utilizing the first and second embodiments of the synchronization controller in accordance with the present invention.

FIG. 15 is a flow chart illustrating the operation of the multi-level symbol synchronizer utilizing the three embodiments of the synchronization controller described above. The symbol synchronizer is initialized by setting the contents of the data register to zero, and by setting the loop count to −8, at step 1102. The loop counter count is checked to determine when the loop counter count reaches +8, at step 1104, indicating the end of the predetermined sampling time interval. When the loop counter count is less than +8, the controller monitors whether a change of state has occurred, at step 1106. When a change of state has occurred, at step 1106, the magnitude difference D is recorded, such as during the symbol synchronization maintenance mode of FIGS. 11 and 12, together with the time location T of the state change, at step 1108.

When the time location is negative, and the magnitude difference is utilized, the magnitude difference D is converted to a negative number, at step 1114, and added to the current loop counter count together with the previous accumulation stored in the data register. The new accumulation, which includes loop count and magnitude accumulations, is then stored in the data register, at step 1116. When the magnitude difference is not utilized, only the current time location of the state change is added to the previous accumulation which is stored in the data register, at step 1116. The new accumulation, which includes only loop count accumulations is then stored in the data register, at step 1116.

When the time location is positive, at step 1110, and the magnitude difference is utilized, the magnitude difference D, is converted to a positive number, at step 1112, and added to the loop counter count together with the previous accumulation stored in the data register. The new accumulation, which includes loop count and magnitude accumulations, is then stored in the data register at step 1116. When the magnitude difference is not utilized, only the current time location of the state change is added to the previous accumulation which is stored in the data register, at step 1116. The new accumulation, which includes only loop count accumulations is then stored in the data register, at step 1116.

The loop counter count is checked to determine when the count becomes a $-1$, at step 1118. When the loop counter count is not a $-1$, at step 1118, the loop counter count is increment by one, at step 1120. When the loop counter count is found to be a $-1$, at step 1118, the loop counter count is set to $+1$, at step 1122, on the next sample clock pulse. After the loop counter count is incremented, either at step 1120 or at step 1122, the loop counter count is again checked to determine when the count reaches $+8$, at step 1104.

When a state change is not detected, at step 1106, the loop counter count is checked to determine when the count becomes a $-1$, at step 1118, and the operation continues as described above.

When the loop counter count reaches $+8$, at step 1104, indicating the end of the predetermined time period is reached, a determination is made, at step 1124, whether the symbol synchronization acquisition mode or the maintenance mode of operation is in effect. When the acquisition mode is in effect (BWC $=0$), at step 1124, the register contents is used to control the loop counter adjustment, at step 1126. In a first embodiment described above, the loop counter count is either advanced or retarded by 1/16 symbol time per clock interval (ADJUST=1), as shown in step 1126A. In the second embodiment described above, the loop counter count is advanced or retarded by N/16 symbol times per clock interval, as shown at step 1126B, depending on the register value, as described in TABLE V above. When the symbol synchronization maintenance mode of operation is indicated (BWC=1), at step 1124, the register contents is used to control the loop counter adjustment, either to advance or retard the count by 1/16 symbol time, as described above.

When a decision is made, either at step 1126 or step 1128 to adjust the loop counter count, the data register contents is checked to determine when the the loop counter is to be incremented, or decremented, at step 1130. When the loop counter is to be incremented, the register contents is set to zero, and the loop counter count is adjusted to a value of $-8 +N$, where N is the number of symbol times to be adjusted. When the loop counter is to be decremented, at step 1130, the register contents is set to zero, and the loop counter count is adjusted to a value of $+8$, and held at the value of $+8$ for the number of symbol times to be adjusted, and thereafter, the loop counter count is set to $-8$ at step 1134. When the loop counter count is held at $+8$, steps 1106 through, but not including step 1104, are performed in order that any succeeding changes are detected.

Figure 16:
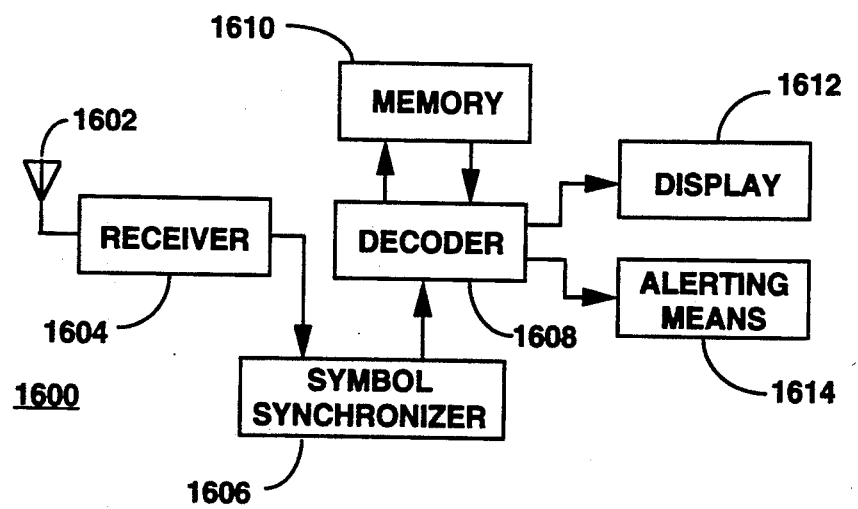
FIG. 16 is an electrical block diagram of a communication receiver using a symbol synchronizer constructed in accordance with the present invention.

FIG. 16 is an electrical block diagram of a communication receiver utilizing the multi-level symbol synchronizer, described above. The transmitted multi-level data signals, which include address and message information, are intercepted by antenna 1602 and processed by the receiver section 1604 in a manner well known in the art. The output of the receiver section 1604 is a stream of multi-level data signals which are processed by the symbol synchronizer 1606, as described above, to obtain symbol synchronization with the received multi-level data signals. The synchronized data symbols, which include the address information, is processed by the decoder 1608 in a manner well known in the art. When the address information received matches an address assigned to the receiver, the decoder 1608 generates an alert signal which is coupled to an alerting means 1614, such as an audio transducer or a vibrator, to alert the user of the received message. The message information, such as numeric or alphanumeric information, which has been received following the address information is generally stored in a memory 1610, and can be recalled by the user to be displayed on a display 1612, such as an LCD display.

We claim:

1. A symbol synchronizer for a communication receiver receiving multi-level data signals, comprising:
    reference clock generating means, for generating a reference clock signal having a predetermined time period;
    detecting means for detecting state changes occurring within the received multi-level data signals over the predetermined time period, and for determining time locations corresponding thereto, wherein the time locations are assigned predetermined numeric values corresponding to the time locations determined;
    accumulating means, coupled to said reference clock generating means and responsive to the numeric values determined, for accumulating a time location count; and
    phase adjusting means, coupled to said reference clock generating means, and responsive to the time location count accumulated, for adjusting the phase of the reference clock signal relative to the received multi-level data signal.

2. The symbol synchronizer according to claim 1 wherein the time locations identify one of a plurality of predetermined phases of the reference clock signal.

3. The symbol synchronizer according to claim 1, wherein said symbol synchronizer further comprises converting means for converting the received multi-level data signals into binary data symbols.

4. The symbol synchronizer according to claim 3, wherein the binary data symbols comprise at least first and second binary data signals.

5. The symbol synchronizer according to claim 3, wherein said converting means comprises:
    reference level generating means, for generating at least three reference level signals;
    level detecting means, responsive to the reference level signals and the binary data symbols, for generating a data level detection signals; and
    decoding means, responsive to the data level detection signals, for generating at least a pair of binary data signals in response thereto.

6. The symbol synchronizer according to claim 1, wherein the detected time locations, are assigned positive and negative values within predetermined portions of the predetermined time period.

7. The symbol synchronizer according to claim 1, wherein said reference clock generating means comprises:
    timing means, for generating timing signals;
    counting means, responsive to the timing signals, for generating a sequence of counts representing numeric values which depict a sequence of time locations; and count decoding means, responsive to the generated sequence of counts, for generating the reference clock signal.

8. The symbol synchronizer according to claim 1, wherein said detecting means comprises:
delay means, responsive to the binary data signals, for generating at least a pair of delayed binary data signals; and
comparing means, responsive to the binary data signals and delayed binary data signals, for generating a state change signal.

9. The symbol synchronizer according to claim 1, wherein said accumulating means comprises:
register means, for storing the time location count; and
adder means, responsive to the numeric values depicting the time locations and the time location count stored, for generating a new time location count, the new time location count being stored within said register means.

10. The symbol synchronizer according to claim 1, wherein said detecting means further comprises magnitude detecting means, responsive to the magnitude of the received multi-level data signals, for generating magnitude value signals in response thereto.

11. The symbol synchronizer according to claim 10, wherein said accumulating means, is further responsive to the magnitude values, for accumulating a total time location/magnitude count from the time location count and magnitude values generated; and
phase adjusting means, coupled to said reference clock generating means, and responsive to the total time location/magnitude count, for adjusting the phase of the reference clock signal relative to the received multi-level data signal.

12. The symbol synchronizer according to claim 1, further comprising state change accumulating means, for accumulating a count of the state changes detected within the received multi-level data signals over the predetermined time period.

13. The symbol synchronizer according to claim 12, wherein the detected state changes are assigned positive and negative values corresponding to the time location detected with the predetermined time period.

14. The symbol synchronizer according to claim 12, further comprising averaging means, coupled to said accumulating means and to said state change accumulating means, for generating a time location average of the changes of state within the received predetermined time period.

15. The symbol synchronizer according to claim 1, further comprising symbol recovery means, responsive to the timing signals for providing a further adjustment of the phase of the reference clock signal relative to the received multi-level data signal.

16. A method for synchronizing a received multi-level data signal within a communication receiver, said method comprising the steps of:
generating a reference clock signal having a predetermined time period;
detecting state changes occurring within the received multi-level data signals over the predetermined time period to enable determining time locations corresponding thereto, wherein the time locations are assigned predetermined numeric values corresponding to the time locations determined;
accumulating a time location count in response to the reference clock signal and the numeric values determined; and
adjusting the phase of the reference clock signal relative to the received multi-level data signal in response to the time location count accumulated.

17. The method for synchronizing a received multi-level data signal according to claim 16, further comprising the steps of:
detecting magnitude changes occurring within the received multi-level data signals over the predetermined time period;
accumulating a magnitude change count with the time location count over the predetermined time interval, and for generating a phase adjustment signal in response thereto; and
adjusting the phase of the reference clock signal relative to the received multi-level data signal in response to the phase adjustment signal generated.

18. The method of synchronizing a received multi-level data signal according to claim 16, further comprising the steps of:
accumulating a count of the number of state changes detected over the predetermined time period;
generating a time location count average in response to the number of state changes detected, and generating a phase adjustment signal in response thereto; and
adjusting the phase of the reference clock signal relative to the received multi-level data signal in response to the phase adjustment signal generated.

19. A communication receiver for receiving multi-level data signals including address and message information, comprising:
receiving means for receiving the multi-level data signals; reference clock generating means, for generating a reference clock signal having a predetermined time period;
detecting means, for detecting state changes occurring within the received multi-level data signals over the predetermined time period to enable determining time locations corresponding thereto;
accumulating means, coupled to said reference clock generating means, for accumulating a time location count corresponding to the time locations identified;
phase adjusting means, coupled to said reference clock generating means, and responsive to the time location count accumulated, for adjusting the phase of the reference clock signal relative to the received multi-level data signal;
decoding means, responsive to the reference clock signal, for decoding the received multi-level data signal address information, and for generating a control signal in response thereto; and
alerting means, responsive to the control signal, for generating an alert signal in response thereto.

20. The communication receiver according to claim 19 further comprising:
memory means, coupled to said decoding means, for storing the received message information; and
display means, coupled to said decoding means and to said memory means, for displaying the stored message information.

* * * * *